US012744329B2

(12) United States Patent
Ai et al.

(10) Patent No.: US 12,744,329 B2
(45) Date of Patent: Sep. 22, 2026

(54) RADIATING ELEMENTS HAVING DIPOLE ARMS WITH CLOAKED DIELECTRIC LOADING ELEMENTS AND BASE STATION ANTENNAS INCLUDING SUCH RADIATING ELEMENTS

(71) Applicant: Outdoor Wireless Networks LLC, Claremont, NC (US)

(72) Inventors: Xiangyang Ai, Plano, TX (US); Chengcheng Tang, Murphy, TX (US); Zeeshan Qamar, Richardson, TX (US); Rui An, Allen, TX (US)

(73) Assignee: Outdoor Wireless Networks LLC, Richardson, TX (US)

( * ) Notice: Subject to any disclaimer, the term of this patent is extended or adjusted under 35 U.S.C. 154(b) by 184 days.

(21) Appl. No.: 18/442,170

(22) Filed: Feb. 15, 2024

(65) Prior Publication Data

US 2024/0283164 A1 Aug. 22, 2024

Related U.S. Application Data

(60) Provisional application No. 63/446,413, filed on Feb. 17, 2023.

(51) Int. Cl.

| | |
|---|---|
| ***H01Q 5/48*** | (2015.01) |
| ***H01Q 9/44*** | (2006.01) |
| ***H01Q 21/06*** | (2006.01) |

(52) U.S. Cl.
CPC ............ *H01Q 21/062* (2013.01); *H01Q 5/48* (2015.01); *H01Q 9/44* (2013.01)

(58) Field of Classification Search
CPC ........... H01Q 1/24; H01Q 1/246; H01Q 1/42; H01Q 15/00; H01Q 15/0013; H01Q 15/14; H01Q 21/06; H01Q 21/062; H01Q 21/26; H01Q 5/42; H01Q 5/48; H01Q 9/44
See application file for complete search history.

(56) References Cited

U.S. PATENT DOCUMENTS

| | | | | |
|---|---|---|---|---|
| 6,897,820 B2 * | 5/2005 | Frenkel | H01Q 15/0013 343/756 |
| 8,797,230 B2 * | 8/2014 | Leisten | H01Q 9/27 343/895 |
| 11,152,693 B2 * | 10/2021 | Tanaka | H01Q 21/28 |
| 11,177,578 B2 * | 11/2021 | Sone | H01Q 21/29 |
| 12,176,632 B2 * | 12/2024 | Zhang | H01Q 5/314 |

* cited by examiner

*Primary Examiner* — Tho G Phan
(74) *Attorney, Agent, or Firm* — Myers Bigel, P.A.

(57) ABSTRACT

A base station antenna includes a reflector, a first radiating element that extends forwardly from the reflector and that is configured to operate in a first frequency band, and a second radiating element that extends forwardly from the reflector and that is configured to operate in a second frequency band that is different from the first frequency band. The first radiating element comprises a first dipole radiator that has first and second dipole arms, a second dipole radiator that has third and fourth dipole arms, a first dielectric block positioned adjacent the first dipole arm, and a first metal pattern positioned between the first dielectric block and the reflector.

20 Claims, 9 Drawing Sheets

RADIATING ELEMENTS HAVING DIPOLE ARMS WITH CLOAKED DIELECTRIC LOADING ELEMENTS AND BASE STATION ANTENNAS INCLUDING SUCH RADIATING ELEMENTS

CROSS-REFERENCE TO RELATED APPLICATION

The present application claims priority to U.S. Provisional Patent Application Ser. No. 63/446,413, filed Feb. 17, 2023, the entire content of which is incorporated herein by reference.

FIELD

The present invention generally relates to radio communications and, more particularly, to base station antennas utilized in cellular and other communications systems

BACKGROUND

Cellular communications systems are well known in the art. In a typical cellular communications system, a geographic area is divided into a series of regions that are referred to as "cells," and each cell is served by a base station. The base station may include baseband equipment, radios and base station antennas that are configured to provide two-way radio frequency ("RF") communications with subscribers that are positioned throughout the cell. Most cells are divided into a plurality of "sectors," and separate base station antennas provide coverage to each of the sectors. The base station antennas are often mounted on a tower or other raised structure, with the radiation pattern ("antenna beam") that is generated by each antenna directed outwardly to serve a respective sector. Typically, a base station antenna includes one or more phase-controlled arrays of radiating elements, with the radiating elements arranged in one or more vertical columns when the antenna is mounted for use. Herein, "vertical" refers to a direction that is generally perpendicular relative to the plane defined by the horizon. Reference will also be made herein to the "azimuth" plane, which refers to a horizontal plane that bisects the base station antenna that is parallel to the plane defined by the horizon.

A common base station configuration is a "three sector" configuration in which a cell is divided into three 120° sectors in the azimuth plane, and the base station includes three base station antennas that provide coverage to the three respective sectors. In a three sector configuration, the antenna beams generated by each base station antenna typically have a half power beamwidth in the azimuth plane ("azimuth HPBW") of about 65°. Such antenna beams may provide good coverage to a 120° sector in the azimuth plane.

Each individual radiating element in the above-discussed arrays will typically be designed to generate an individual antenna beam (i.e., the antenna beam that is generated if an RF signal is only transmitted through a single radiating element of the array, which is also referred to herein as an "element pattern") having an azimuth HPBW of about 65°. The azimuth HPBW of an antenna beam generated by an array of radiating elements is a function of (among other things) the azimuth HPBW of the element pattern of the radiating elements in the array and the distance between the leftmost and rightmost radiating elements in the array (referred to as the "aperture" of the array in the azimuth plane). As noted above, for a three-sector base station, it is typically desired that the antenna beams generated by an array of radiating elements have an azimuth HPBW of about 65°. Since most radiating elements are designed to have an azimuth HPBW of about 65°, a single radiating element, or a vertically-extending column of radiating elements, will generate antenna beams having the desired 65° azimuth HPBW.

Cellular communications are primarily performed in three different frequency ranges, which are commonly referred to as the "low-band," "mid-band" and "high-band" frequency ranges. The low-band frequency range is generally defined as the 696-960 MHz frequency range (or more recently as the 617-960 MHz frequency range). The mid-band frequency range is generally defined as the 1695-2690 MHz frequency range (or, more recently as the 1427-2690 MHz frequency range). The high-band frequency range is more variable in nature, but may include different ranges of frequencies in the 3.1-5.8 GHz frequency range. Cellular operators are licensed to use small sub-bands in each of these frequency ranges, where the sub-bands will vary with geographic location and cellular operator. Consequently, base station antennas typically include linear arrays that support service across the full low-band and mid-band frequency ranges so that the antennas can be used by any operator in any geographic location.

Most modern base station antennas include arrays that are formed using dual polarization radiating elements. A dual polarization radiating element refers to a radiating element that has first and second radiators that transmit/receive RF signals at orthogonal (i.e., non-interfering) polarizations. The use of dual polarization radiating elements allows the number of antenna beams generated by an antenna to be doubled as compared to an antenna that uses single polarization radiating elements, typically with only a minimal increase in the size of the antenna. For example, so-called slant +45°/−45° cross-dipole radiating elements are commonly used in base station antennas. These radiating elements include a first dipole radiator that is oriented at an angle of +45° (with respect to the horizon) and a second dipole radiator that is oriented at an angle of −45° so that together the two dipole radiators have a cross-shape. The first dipole radiator is fed a first RF signal through a first RF port to generate a first element pattern having a +45° linear polarization, and the second dipole radiator is fed a second RF signal through a second RF port to generate a second element pattern having a −45° linear polarization. The first and second RF ports may be coupled to respective first and second ports of a radio.

There is significant interest in base station antennas that include two linear arrays of low-band radiating elements, since such base station antennas can support 4×MIMO communications in the low-band. MIMO stands for "multi-input-multi-output," and the term 4×MIMO refers to a communication technique where a baseband data stream is sub-divided into four sub-streams that are used to generate four RF signals that are transmitted through multiple different arrays of radiating elements. The different arrays are, for example, spatially separated from one another and/or at orthogonal polarizations so that the transmitted RF signals will be sufficiently decorrelated. The four RF signals are recovered at the receiver and demodulated and decoded to recover the original four data sub-streams, which are then recombined. The use of MIMO transmission techniques may help overcome the negative effects of multipath fading, and may be particularly effective in urban environments where reflections may increase the level of decorrelation between the RF signals. When dual-polarized radiating elements are used, two linear arrays of low-band radiating elements can be used to transmit four separate RF signals, and thus can support 4×MIMO communications.

The size of a radiating element is inversely correlated with its frequency of operation, and hence the low-band radiating elements are usually the largest radiating elements in a base station antenna. Consequently, it can be challenging to implement base station antennas that have two arrays of dual polarization low-band radiating elements where the base station antenna meets cellular operator expectations for the width of the base station antenna.

FIG. 1 is a schematic front view of a conventional multiband base station antenna 1 (with the radome thereof removed) that illustrates the difficulty of providing a narrow width base station antenna that includes two linear arrays of low-band radiating elements. A multiband base station antenna refers to an antenna that includes arrays of radiating elements that operate in different frequency bands.

As shown in FIG. 1, base station antenna 1 includes first and second linear arrays 20-1, 20-2 of dual polarized low-band radiating elements 22 and first and second linear arrays 30-1, 30-2 of dual polarized mid-band radiating elements 32. Herein, when multiple of the same elements are included in an antenna, the elements may be referred to individually by their full reference numeral (e.g., low-band array 20-2) and collectively by the first part of their reference numerals (e.g., the low-band arrays 20). Each linear array 20-1, 20-2, 30-1, 30-2 is implemented as a vertically-extending column of radiating elements.

As shown in FIG. 1, the low-band and mid-band radiating elements 22, 32 are mounted to extend forwardly from a reflector 10. The mid-band radiating elements 32 are smaller than the low-band radiating elements 22 and hence are mounted behind the low-band radiating elements 22. The low-band radiating elements 22 are schematically shown as being implemented as slant −45°/+45° radiating elements that each include a first dipole radiator 24-1 that transmits and receives RF radiation having a slant +45° linear polarization and a second dipole radiator 24-2 that transmits and receives RF radiation having a slant −45° linear polarization. The first dipole radiator 24-1 of each low-band radiating element 22 in the first linear array 20-1 is coupled to a first low-band RF port 40-1 through a first feed network (not shown). The first feed network sub-divides RF signals input thereto from the RF port 40-1 into a plurality of sub-components and feeds these sub-components to the respective first dipole radiators 24-1 of the radiating elements 22 in the first low-band linear array 20-1. The second dipole radiator 24-2 of each low-band radiating element 22 in the first low-band linear array 20-1 is coupled to a second low-band RF port 40-2 through a second feed network (not shown) that performs the same function as the above-described first feed network. Thus, RF signals input at RF port 40-1 are transmitted by the first dipole radiators 24-1 of the radiating elements 22 of the first low-band array 20-1 to generate a first low-band antenna beam (having a +45° polarization), and RF signals input at RF port 40-2 are transmitted through the second dipole radiators 24-2 of the radiating elements 22 of the first low-band array 20-1 to generate a second low-band antenna beam (having a −45° polarization). The second low-band array 20-2 is coupled to the third and fourth low-band RF ports 40-3, 40-4 in the same manner and hence can generate third and fourth low-band antenna beams. The first and second dipole radiators 34-1, 34-2 of each mid-band radiating element 32 are coupled to fifth through eighth RF ports 40-5 through 40-8 in the same manner that the dipole radiators 24-1, 24-2 of the low-band radiating elements 22 are coupled to the first through fourth RF ports 40-1 through 40-4.

Base station antennas having the design of base station antenna 1 will typically have a width that exceeds 400 mm and often more than 450 mm. Antennas having such large widths are heavy, have high wind loading, and may exceed local ordinances governing the permissible sizes for base station antennas. Several techniques, however, are known in the art for reducing the width of a base station antenna. For example, U.S. Pat. No. 10,879,605 discloses several antenna designs that include arrays of radiating elements that comprise a column of radiating elements plus an additional radiating element that is horizontally offset from the column of radiating elements. The additional horizontally offset radiating element increases the "aperture" of the array in the azimuth plane, which acts to narrow the azimuth beamwidth of the antenna beams generated by the array. However, since only a single horizontally offset radiating element is added to the array, the overall impact on the azimuth beamwidth tends to be small. As another example, the width of the antenna may be reduced by decreasing the lateral spacing between the linear arrays 20-1, 20-2. However, this results in increased coupling between the linear arrays 20-1, 20-2 and this "parasitic" coupling can itself lead to an undesired increase in the azimuth HPBW of the generated antenna beams. It is also possible to reduce the size of each low-band radiating element 22 to decrease the width of the base station antenna, but the smaller low-band radiating elements 22 have larger azimuth HPBWs and thus the generated antenna beams will tend to have reduced gain and/or spill over into neighboring sectors. Consequently, it may be difficult to provide base station antennas that have two or more arrays of dual polarization low-band radiating elements in a commercially acceptable manner.

Another complication that is present in multiband antennas (i.e., an antenna that includes linear arrays that operate in different frequency bands) is that coupling between the radiating elements of the different arrays may occur. This coupling may cause "scattering" of the RF signals emitted by a second frequency band linear array by the radiating elements of a first frequency band linear array. Scattering is undesirable as it may change the shape of the antenna beams generated by the second frequency band linear array, and the changes in the shape of the antenna beam may vary significantly with frequency. This may make it difficult to compensate for the effects of scattering using other techniques. For example, scattering tends to negatively impact the beamwidth, beam shape, pointing angle, gain and front-to-back ratio of the antenna beams in the azimuth plane.

Scattering primarily occurs when a conductive structure of a first frequency band radiating element has an electrical length that makes the structure resonant in the operating frequency band of a nearby radiating element that operates in the second (different) frequency band. As discussed above, most modern base station antennas include low-band radiating elements that operate in the 617-960 MHz frequency band or a portion thereof and mid-band radiating elements that operate in the 1427-2690 MHz frequency band or a portion thereof. If cross-dipole radiating elements are used, each low-band dipole radiator typically is implemented as a pair of dipole arms that each have an electrical length that is approximately ¼ a wavelength (herein "the center wavelength") that corresponds to the center frequency of the operating frequency band for the low-band radiating element. Thus, each dipole radiator has an electrical length that is approximately ½ the "center" wavelength.

Since the mid-band frequency range encompasses frequencies that are twice the frequencies in the low-band frequency range, the electrical length of each low-band dipole arm may be approximately ½ a wavelength of RF signals transmitted in the lower portion of the mid-band operating frequency band. As such, RF energy transmitted by the mid-band radiating elements (particularly when the mid-band radiating elements operate in the lower portion of the mid-band operating frequency band) may couple to the dipole arms of nearby low-band radiating elements, where such RF energy is then re-radiated from the low-band dipole arms, often in undesired directions. Such coupling and re-radiating of the mid-band RF energy by the low-band dipole arms acts to distort the antenna beams generated by the array of mid-band radiating elements.

Radiating elements that are designed to suppress such scattering are known in the art, and are commonly referred to as "cloaking" radiating elements. For example, U.S. Pat. No. 10,439,285 and U.S. Pat. No. 10,770,803 each disclose low-band radiating elements that include dipole arms that are formed as a series of widened metal segments that are coupled by narrow inductive metal segments, which may be implemented as small, meandered trace segments on a printed circuit board. The entire content of U.S. Pat. Nos. 10,439,285 and 10,770,803 is incorporated herein by reference. In each case, the narrow inductive metal segments act as high impedance elements for RF energy in the mid-band frequency range, rendering the low-band radiating elements substantially transparent to RF energy in that frequency range. These cloaking radiating elements are designed so that the RF energy emitted by the mid-band radiating element tends to not form mid-band currents on the dipole arms of the low-band radiating elements.

SUMMARY

Pursuant to embodiments of the present invention, base station antennas are provided that comprise a reflector, a first radiating element that extends forwardly from the reflector and that is configured to operate in a first frequency band and a second radiating element that extends forwardly from the reflector and that is configured to operate in a second frequency band that is different from the first frequency band. The first radiating element comprises a first dipole radiator that has first and second dipole arms, a second dipole radiator that has third and fourth dipole arms, a first dielectric block positioned adjacent the first dipole arm, and a first metal pattern positioned between the first dielectric block and the reflector.

In some embodiments, the first metal pattern is configured to attenuate RF energy emitted by the second radiating element that is incident on the first metal pattern. In some embodiments, the metal pattern is unitary with the dielectric block. In some embodiments, the first metal pattern comprises a metamaterial.

In some embodiments, the first radiating element further comprises a second dielectric block positioned adjacent the second dipole arm, a second metal pattern positioned between the second dielectric block and the reflector, a third dielectric block positioned adjacent the third dipole arm, a third metal pattern positioned between the third dielectric block and the reflector, a fourth dielectric block positioned adjacent the fourth dipole arm, and a fourth metal pattern positioned between the fourth dielectric block and the reflector.

In some embodiments, the first dipole arm is implemented using a first printed circuit board, and the first dielectric block is mounted rearwardly of the first printed circuit board.

In some embodiments, the first metal pattern is printed on the first dielectric block.

In some embodiments, the first metal pattern has a negative refractive index. In some embodiments, the first metal pattern has at least one of a negative permittivity and a negative permeability within at least a portion of the second frequency band.

In some embodiments, the first dielectric block has a dielectric constant that is greater than 4.0.

In some embodiments, the first metal pattern comprises a plurality of unit cell structures. In some embodiments, each unit cell includes a plurality of sub-unit cells, and wherein at least some of the sub-cells in a first of the unit cells are oriented differently from other of the sub-cells in the first of the unit cells.

In some embodiments, a thickness of the first dielectric block in the forward direction is at least ten times a thickness of the first dipole arm.

In some embodiments, each of the first through fourth dipole arms has an end-to-end physical length that is less than 0.2 of a wavelength that corresponds to a center frequency of the first frequency band.

In some embodiments, the first dielectric block is configured to dielectrically load the first dipole arm.

In some embodiments, the first dipole arm is implemented as a sheet metal dipole arm.

In some embodiments, the first dipole arm is configured to be substantially transparent to RF energy emitted by the second radiating element.

Pursuant to further embodiments of the present invention, base station antennas are provided that comprise a second radiating element that that is configured to operate in a second frequency band, a first radiating element that is configured to operate in a first frequency band that is different from the second frequency band, the first radiating element comprising a first radiator and a first dielectric loading element for the first radiator, the first dielectric loading element including a first metal pattern that is not part of the first radiator and that is configured to reduce the impact of the first dielectric loading element on RF energy emitted by the second radiating element.

In some embodiments, a first dipole radiator has first and second dipole arms, the first radiating element further comprising a second dipole radiator that has third and fourth dipole arms, and the first dielectric loading element is positioned adjacent the first dipole arm.

In some embodiments, the first dipole arm is implemented using a first printed circuit board, and the first dielectric loading element is mounted rearwardly of the first printed circuit board.

In some embodiments, the first dipole arm is implemented as a sheet metal dipole arm.

In some embodiments, the first metal pattern is unitary with the first dielectric loading element.

In some embodiments, the first radiating element further comprises a second dielectric loading element positioned adjacent the second dipole arm, a second metal pattern positioned between the second dielectric block and the reflector, a third dielectric loading element positioned adjacent the third dipole arm, a third metal pattern positioned between the third dielectric block and the reflector, a fourth dielectric loading element positioned adjacent the fourth dipole arm, and a fourth metal pattern positioned between the fourth dielectric block and the reflector.

In some embodiments, the first metal pattern comprises a metamaterial.

In some embodiments, the first metal pattern is printed on the first dielectric loading element.

In some embodiments, the first metal pattern has a negative refractive index. In some embodiments, the first metal pattern has at least one of a negative permittivity and a negative permeability within at least a portion of the second frequency band.

In some embodiments, each of the first through fourth dielectric loading elements has a dielectric constant that is greater than 4.0.

In some embodiments, the first metal pattern comprises a plurality of unit cell structures.

In some embodiments, each of the first through fourth dipole arms has an end-to-end physical length that is less than 0.2 of a wavelength that corresponds to a center frequency of the first frequency band.

Pursuant to still further embodiments of the present invention, radiating elements that are configured to operate in a first frequency band are provided that comprise a first dipole radiator that has a first dipole arm and a second dipole arm and a second dipole radiator that has a third dipole arm and a fourth dipole arm, wherein one or more dielectric blocks having dielectric constants of at least 4.0 are positioned adjacent the first through fourth dipole arms to dielectrically load the first through fourth dipole arms, and the dielectric blocks are cloaked with respect to RF energy in a second frequency band that is different from the first frequency band.

In some embodiments, the first dipole arm is implemented using a first printed circuit board, and the first dielectric block is mounted rearwardly of the first printed circuit board.

In some embodiments, the first dipole arm is implemented as a sheet metal dipole arm.

In some embodiments, the one or more dielectric blocks each include a respective associated metal pattern that is configured to act as a partially reflective surface in the second frequency band.

In some embodiments, each associated metal pattern is unitary with a respective one of the one or more dielectric blocks.

In some embodiments, each associated metal pattern comprises a metamaterial.

In some embodiments, each associated metal pattern comprises a plurality of unit cell structures. In some embodiments, each unit cell includes a plurality of sub-unit cells, and wherein at least some of the sub-cells in a first of the unit cells are oriented differently from other of the sub-cells in the first of the unit cells.

Pursuant to yet additional embodiments of the present invention, radiating elements that are configured to operate in a first frequency band are provided that comprise a feed stalk, a first dipole radiator that has a first dipole arm and a second dipole arm, the first dipole radiator mounted adjacent a forward end of the feed stalk, a second dipole radiator that has a third dipole arm and a fourth dipole arm, the second dipole radiator mounted adjacent the forward end of the feed stalk, a dielectric block positioned immediately behind the first dipole arm, and a metal pattern that includes a plurality of unit cell structures positioned immediately behind the dielectric block.

In some embodiments, the metal pattern is unitary with the dielectric block.

In some embodiments, the radiating element further comprises a second dielectric block positioned immediately behind the second dipole arm, a second metal pattern positioned between the second dielectric block and the reflector, a third dielectric block positioned immediately behind the third dipole arm, a third metal pattern positioned between the third dielectric block and the reflector, a fourth dielectric block positioned immediately behind the fourth dipole arm, and a fourth metal pattern positioned between the fourth dielectric block and the reflector.

In some embodiments, the first through fourth dielectric blocks each have a dielectric constant that is greater than 4.0.

In some embodiments, the first metal pattern has at least one of a negative permittivity and a negative permeability within at least a portion of the second frequency band.

In some embodiments, each unit cell includes a plurality of sub-unit cells, and wherein at least some of the sub-cells in a first of the unit cells are oriented differently from other of the sub-cells in the first of the unit cells.

In some embodiments, a thickness of the first dielectric block in the forward direction is at least ten times a thickness of the first dipole arm.

In some embodiments, each of the first through fourth dipole arms has an end-to-end physical length that is less than 0.2 of a wavelength that corresponds to a center frequency of the first frequency band.

Pursuant to yet additional embodiments of the present invention, base station antennas are provided that comprise a first RF port, a first power divider, a first array of radiating elements, first polarization radiators of each of the radiating elements in the first array coupled to the first RF port through the first power divider, a second RF port, a second power divider, a second array of radiating elements, first polarization radiators of each of the radiating elements in the second array coupled to the second RF port through the second power divider, and a coupler having a first input port coupled to a first output of the first power divider, a first output port coupled to the first polarization radiator of a first radiating element in the first array of radiating elements, a second input port coupled to a first output of the second power divider, a second output port coupled to the first polarization radiator of a first radiating element in the second array of radiating elements, a first coupling transmission line and a second coupling transmission line. A first end of the first coupling transmission line is connected to a first end of the second coupling transmission line port via an RF transmission line.

In some embodiments, a second end of the first coupling transmission line is connected to a first terminated load. In some embodiments, a second end of the second coupling transmission line is connected to a second terminated load. In other embodiments, a second end of the second coupling transmission line is connected to the first terminated load.

In some embodiments, an electrical length of the RF transmission line is set so that RF energy that passes from the first RF port to the first polarization radiator of the first radiating element in the second array of radiating elements is approximately 180° out-of-phase with respect to RG energy that directly couples from the first polarization radiator of the first radiating element in the first array of radiating elements to the first polarization radiator of the first radiating element in the second array of radiating elements.

In some embodiments, the coupler is a hybrid coupler.

DETAILED DESCRIPTION

Figure 1:
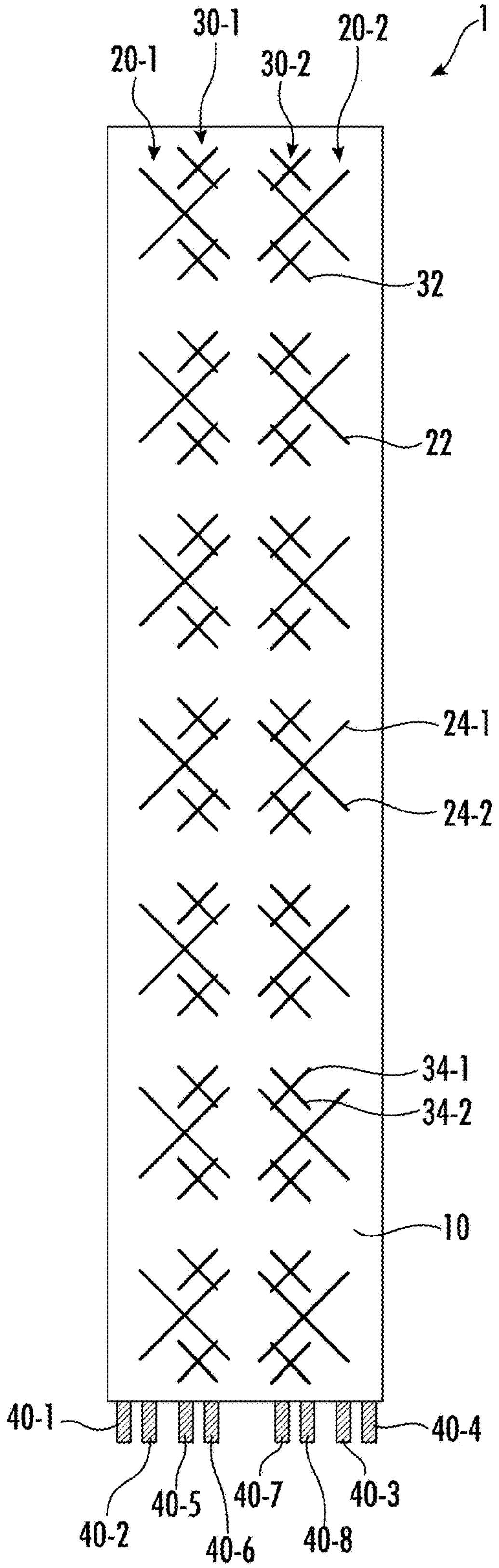
FIG. 1 (PRIOR ART)
FIG. 1 is a schematic front view of a conventional base station antenna (with the radome removed) that includes two arrays of dual polarization low-band radiating elements.

Another known technique for reducing the width of a base station antenna is to use dielectrically-loaded radiating elements. Dielectrically-loaded radiating elements include blocks of high dielectric constant dielectric materials that are placed adjacent one or more sides of the radiators of the radiating element. Since the electrical length of a radiator, such as a dipole radiator, is a function of the dielectric constant of the surrounding medium, the blocks of higher dielectric constant dielectric materials allow the physical length of the dipole radiators to be reduced while the dipole radiators still maintain the electrical length necessary to be resonant in a desired operating frequency band. Radiating elements having such dielectrically-loaded dipole arms are disclosed, for example, in U.S. Patent Publication No. 2022/0006182, filed May 10, 2021, the entire content of which is incorporated herein by reference. Thus, if the dipole arms of the low-band radiating elements 22 in the base station antenna 1 are dielectrically loaded, the size of each low-band radiating element 22 may be reduced, allowing the width of base station antenna 1 to be reduced.

While the dielectric loading of the dipole arms may help reduce the width of the base station antenna 1, the blocks of higher dielectric constant dielectric material can adversely impact the shape of the antenna beams generated by the mid-band linear arrays 30-1, 30-2. As described above, the mid-band radiating elements 32 are mounted behind the low-band radiating elements 22, and hence emit RF radiating through the low-band radiating elements 22. The blocks of higher dielectric constant dielectric material can act like an RF lens focusing RF energy incident thereon, which acts to change the shape of the mid-band antenna beams, typically in undesirable ways. Moreover, since the mechanism (focusing) by which the blocks of higher dielectric constant dielectric material impact the mid-band antenna beams differs from the mechanism (scattering) by which the low-band dipole arms impact the mid-band antenna beams, the techniques used to cloak the low-band dipole arms cannot be used to reduce the impact that the blocks of higher dielectric constant dielectric material have on the mid-band antenna beams.

Pursuant to embodiments of the present invention, multiband base station antennas are provided that include at least two arrays of low-band radiating elements (and hence can support 4×MIMO operations in the low-band frequency range) while having a much smaller size than conventional base station antennas that include multiple low-band arrays. The base station antennas according to embodiments of the present invention may employ dielectrically-loaded low-band radiating elements, since dielectrically loading the low-band radiators may significantly reduce the size of the low-band radiating elements. For example, dielectrically loading the dipole arms may reduce the footprint of each radiating element (i.e., the area defined by the smallest rectangle that encloses the radiating element when viewed from the front) by, for example, more than 20%, more than 30%, more than 40%, more than 50%, or even more than 60% in example embodiments. The amount of the reduction may be a factor of the amount of dielectric loading material and the dielectric constant thereof.

The dielectrically-loaded low-band radiating elements may also include metamaterial metal patterns or other structures that are used to reduce the impact that the dielectric loading material has on RF energy emitted by other radiating elements included in the multiband antenna, such as mid-band radiating elements that are located in close proximity to the low-band radiating elements. If the low-band radiating elements do not include such structures, the dielectric loading material mounted on or adjacent the radiators of the low-band radiating elements may distort the shape of the antenna beams formed by the mid-band radiating elements.

The base station antennas according to embodiments of the present invention may also employ additional techniques for reducing the size of the antenna. These additional techniques may include, for example, using L-shaped or Y-shaped low-band arrays (or other array shapes that widen the aperture of the array in the azimuth plane), which may allow shrinking the size of the low-band radiating elements further. The antennas may also include couplers that are used to increase co-polarization isolation between the two low-band arrays. This may allow positioning the two low-band arrays closer to each other while still having adequate isolation therebetween.

In some embodiments, the above-described multiband base station antennas may include a reflector, a first radiating element that extends forwardly from the reflector and that is configured to operate in a first frequency band, and a second radiating element that extends forwardly from the reflector and that is configured to operate in a second frequency band that is different from the first frequency band. The first radiating element comprises a first dipole radiator that has first and second dipole arms, a second dipole radiator that has third and fourth dipole arms, a dielectric block positioned adjacent the first dipole arm, and a metal pattern positioned between the dielectric block and the reflector.

In other embodiments, these multiband base station antennas may include a first radiating element that is configured to operate in a first frequency band and a second radiating element that is configured to operate in a second frequency band that is different from the first frequency band. The first radiating element includes a first radiator and a dielectric loading element (such as a dielectric block) for the first radiator, where the dielectric loading element includes a metal pattern that is not part of the first radiator and that is configured to reduce the impact of the dielectric loading element on RF energy emitted by the second radiating element.

In still other embodiments, the first radiating elements may include a first dipole radiator that has a first dipole arm and a second dipole arm and a second dipole radiator that has a third dipole arm and a fourth dipole arm. In addition, the first radiating element may further include one or more dielectric blocks that have dielectric constants of at least 4.0 that are positioned adjacent the first through fourth dipole arms to dielectrically load the first through fourth dipole arms. Additionally, the dielectric blocks are cloaked with respect to RF energy in the second frequency band.

In still further embodiments, the first radiating elements may include a feed stalk, a first dipole radiator that has a first dipole arm and a second dipole arm, a second dipole radiator that has a third dipole arm and a fourth dipole arm, a dielectric block positioned immediately behind the first dipole arm, and a metal pattern that includes a plurality of unit cell structures positioned immediately behind the dielectric block.

In any or all of the above embodiments, the first dipole arm may be implemented using a first printed circuit board, and the dielectric block associated with the first dipole arm may be mounted rearwardly of the first printed circuit board. Alternatively, the first dipole arm may be implemented as a sheet metal dipole arm. In some embodiments, the metal pattern may be unitary with the dielectric block. For example, the metal pattern may be printed on the first dielectric block. In some embodiments, the metal pattern may comprise a metamaterial, have a negative refractive index and/or may have at least one of a negative permittivity and a negative permeability within at least a portion of the second frequency band. The metal pattern may comprise a plurality of unit cell structures. In some embodiments, each unit cell may include a plurality of sub-unit cells, and at least some of the sub-cells in a first of the unit cells may be oriented differently from other of the sub-cells in the first of the unit cells. The metal pattern may be configured to attenuate radio RF energy emitted by the second radiating element that is incident on the first metal pattern.

In any or all of the above embodiments, the dielectric block may have a dielectric constant that is greater than 4.0, greater than 5.0, greater than 6.0, greater than 7.0, greater than 8.0, or greater than 9.0. In some embodiments, the first radiating element may further include a second dielectric block positioned adjacent the second dipole arm, a second metal pattern positioned between the second dielectric block and the reflector, a third dielectric block positioned adjacent the third dipole arm, a third metal pattern positioned between the third dielectric block and the reflector, a fourth dielectric block positioned adjacent the fourth dipole arm, and a fourth metal pattern positioned between the fourth dielectric block and the reflector. Each dielectric block may be configured to dielectrically load a respective one of the dipole arms.

The base station antennas according to embodiments of the present invention may be much smaller than conventional base station antennas having the same number and types of arrays. For example, in one embodiment, a circular multiband base station antenna is provided that includes two arrays of low-band radiating elements that are designed to operate in the 718-960 MHz frequency band and two arrays of mid-band radiating elements that are designed to operate in the 1428-2170 MHz frequency band. All four arrays are enclosed within a radome having a diameter of 305 mm. A typical conventional base station antenna having the same arrays would have a width of at least 400 mm.

Embodiments of the present invention will now be discussed in more detail with reference to FIGS. 2A-8B.

Figure 2A:
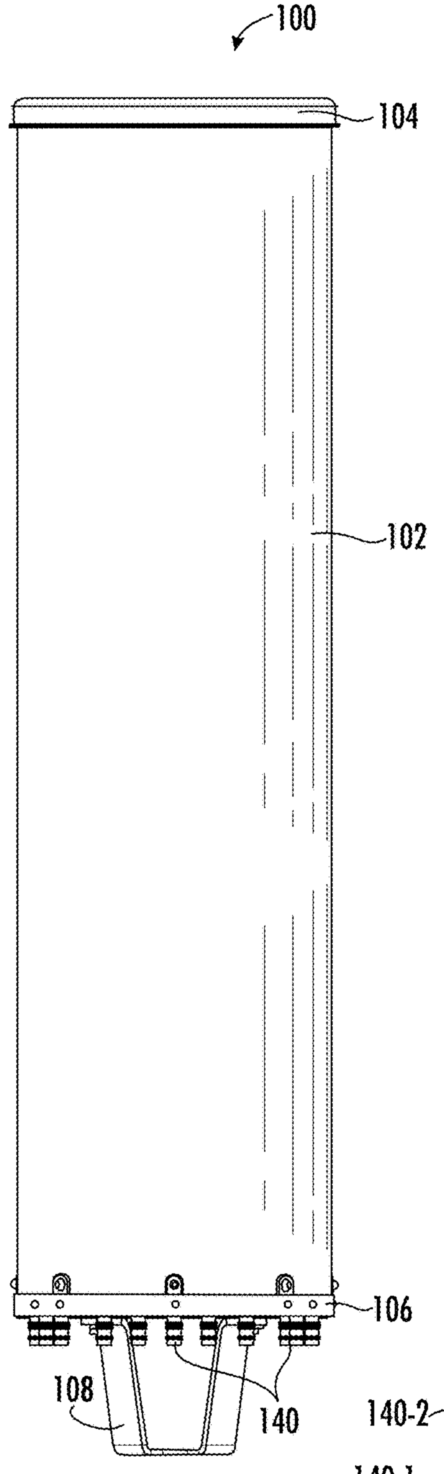
FIG. 2A is a schematic front view of a base station antenna according to embodiments of the present invention.
Figure 2B:
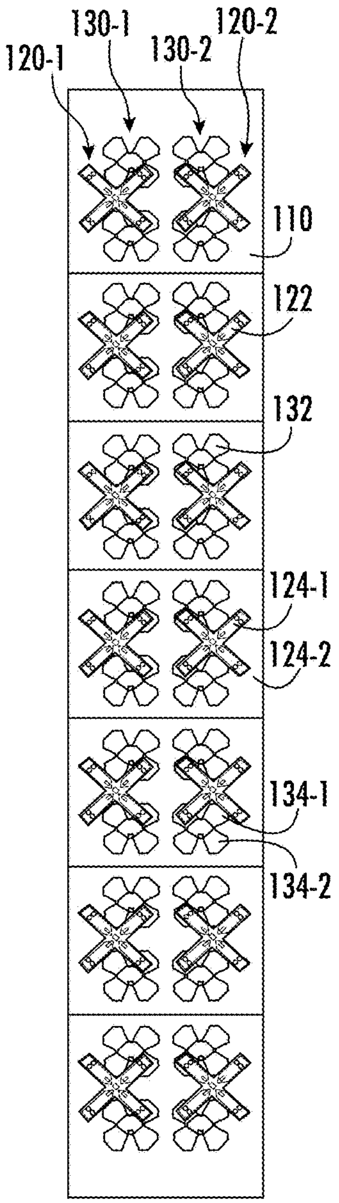
FIG. 2B is a schematic front view of the base station antenna of FIG. 2A with the radome removed to show the linear arrays of radiating elements included in the antenna.
Figure 2C:
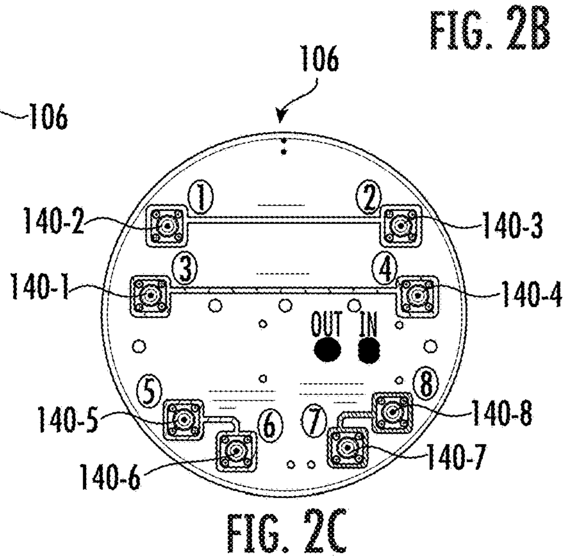
FIG. 2C is a schematic bottom view of the base station antenna of FIG. 2A.

FIGS. 2A-2C illustrate a base station antenna 100 according to certain embodiments of the present invention. In particular, FIGS. 2A and 2C are front and bottom views, respectively, of the base station antenna 100, while FIG. 2B is a schematic front view of the base station antenna 100 with a radome thereof removed to show the linear arrays of radiating elements included in the antenna 100.

Referring to FIGS. 2A and 2C, the base station antenna 100 has a cylindrical shape. A radome 102, top end cap 104 and bottom end cap 106 may define the exterior of the base station antenna 100. A mounting bracket 108 may be provided that may be used to mount the base station antenna 100 on a surface.

Referring to FIG. 2B, the base station antenna 100 also includes a reflector 110. The reflector 110 may comprise, for example, a sheet of metal that serves as a ground plane for the radiating elements (discussed below) and that also redirects forwardly much of the backwardly-directed radiation emitted by these radiating elements.

Still referring to FIG. 2B, the base station antenna 100 includes first and second linear arrays 120-1, 120-2 of low-band radiating elements 122. The base station antenna 100 further includes first and second linear arrays 130-1, 130-2 of mid-band radiating elements 132. Each low-band linear array 120 includes seven low-band radiating elements 122, and each mid-band linear array 130 includes fourteen mid-band radiating elements 132. Each linear array 120, 130 may extend along an axis that is parallel to a longitudinal axis of the base station antenna 100. Since the longitudinal axis of the base station antenna 100 will typically extend substantially vertically with respect to a horizontal plane defined by the horizon when the base station antenna 100 is mounted for use, the linear arrays 120, 130 will be vertically-extending columns that extend in a vertical direction.

Each low-band radiating element 122 is a center-fed slant −45°/+45° polarization cross-dipole radiating element that has a first dipole radiator 124-1 that is configured to transmit and receive slant +45° polarization RF radiation and a second dipole radiator 124-2 that is configured to transmit and receive slant −45° polarization RF radiation. Each low-band radiating element 122 may be configured to operate in some or all of the 617-960 MHz low-band frequency range. Each mid-band radiating element 132 is also a center-fed slant −45°/+45° polarization cross-dipole radiating element that has a first dipole radiator 134-1 that is configured to transmit and receive slant +45° polarization RF radiation and a second dipole radiator 134-2 that is configured to transmit and receive slant −45° polarization RF radiation. Each mid-band radiating element 132 may be configured to operate in some or all of the 1427-2690 MHz mid-band frequency range. Each radiating element 122, 132 is mounted to extend forwardly from the reflector 110.

Referring again to FIGS. 2A and 2C, first through eighth RF ports 140-1 through 140-8 extend through the bottom end cap 106. Each RF port 140 may have a connector interface that allows the RF port 140 to connect to a port of an external radio (e.g., via a coaxial cable). Each RF port 140 is connected to a respective feed network (not shown) that connects each RF port 140 to either the first or second polarization radiators 124 or 134 of the radiating elements 122 or 132 in a respective one of the linear arrays 120 or 130. The base station antenna 100 will generate a respective antenna beam in response to an RF signal input at each RF port 140.

In other embodiments, the base station antenna 100 may further include additional arrays of radiating elements. The number of radiating elements in each array may be varied from what is shown.

As discussed above, it can be difficult to provide base station antennas that include two linear arrays of low-band radiating elements that have widths of less than 400 mm. The base station antenna 100, in contrast, may have a width of less than 350 mm and even as small as 305 mm.

Figure 3A:
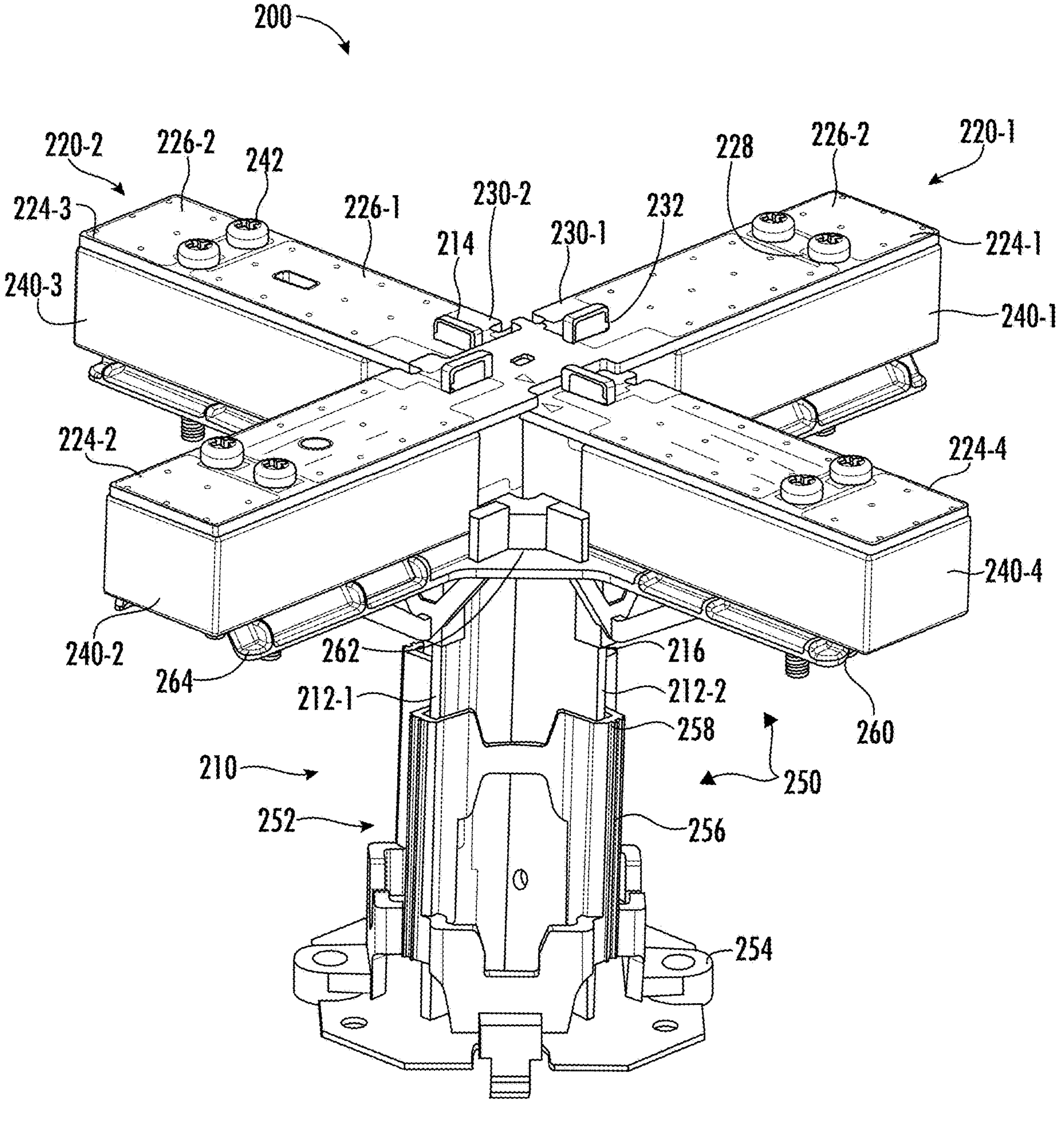
FIG. 3A is a schematic perspective view of one of the low-band radiating elements included in the base station antenna of FIGS. 2A-2C.
Figure 3B:
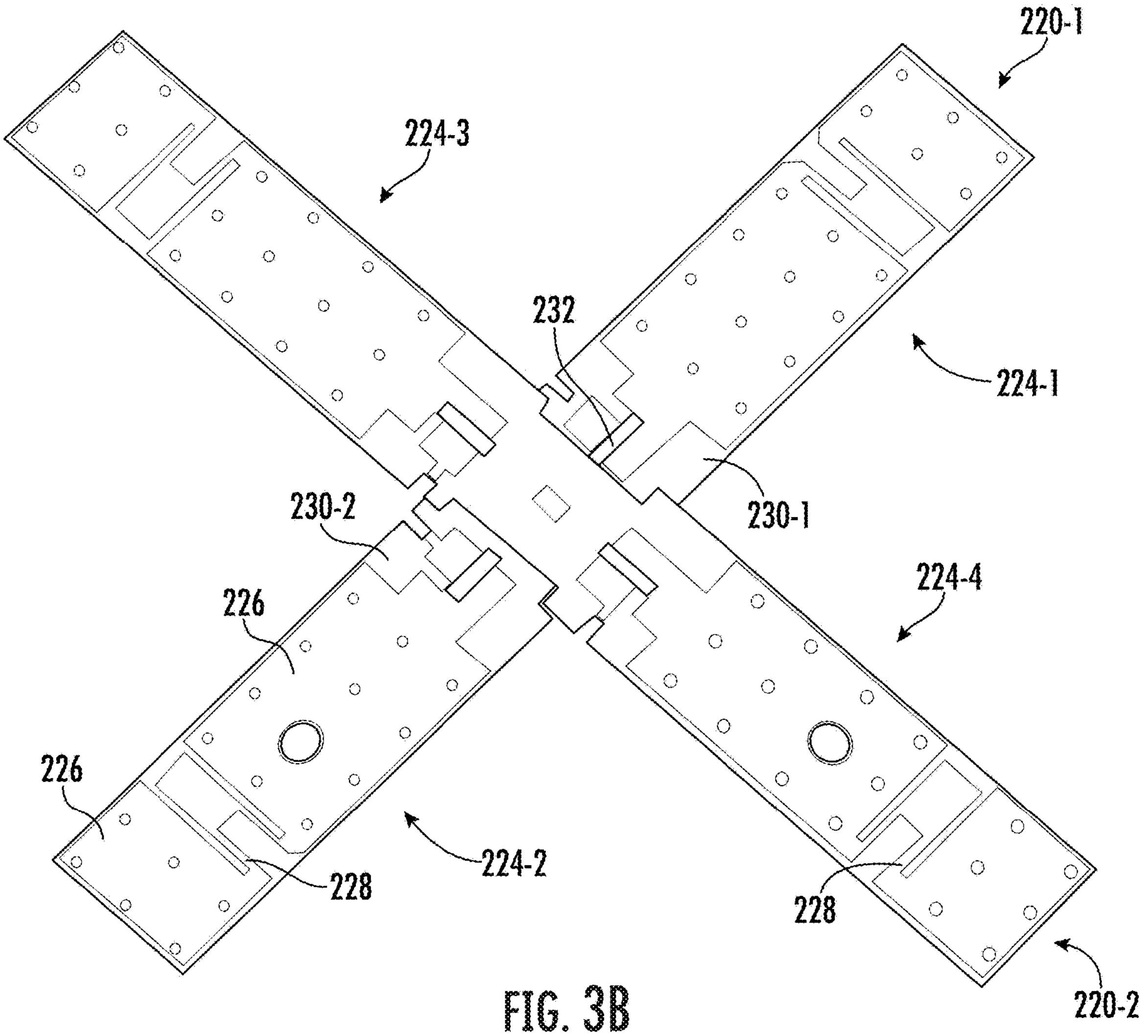
FIG. 3B is a schematic front view of the dipole radiators that are included in the low-band radiating element of FIG. 3A.

FIG. 3A is a schematic perspective view of a low-band radiating element 200 that may be used to implement the low-band radiating elements 122 included in the base station antenna 100 of FIGS. 2A-2C. FIG. 3B is a schematic front view of the dipole radiators that are included in the low-band radiating element of FIG. 3A.

Referring to FIG. 3A, the low-band radiating element 200 includes a feed stalk 210, a pair of dielectrically-loaded dipole radiators 220-1, 220-2, and a dielectric support 250.

The feed stalk 210 may be of any conventional design, and may be used to transfer RF signals between the first and second dipole radiators 220 and first and second feed networks of a base station antenna that includes the low-band radiating element 200 (e.g., a pair of feed networks of base station antenna 100). In the depicted embodiment, the feed stalk 210 comprises a pair of feed stalk printed circuit boards 212-1, 212-2. Feed stalk printed circuit board 212-1 passes RF signals between the first feed network (not shown) and dipole radiator 220-1, and feed stalk printed circuit board 212-2 passes RF signals between the second feed network (not shown) and dipole radiator 220-2. In some embodiments, the feed stalk printed circuit boards 212-1, 212-2 may comprise cloaked feed stalks that are configured to be substantially transparent to RF energy in some or all of the mid-band operating frequency range. For example, any of the cloaked feed stalks disclosed in U.S. Provisional Patent Application Ser. No. 63/437,146, filed Jan. 5, 2023 or in PCT Application Serial No. PCT/CN2023/070056, filed Jan. 3, 2023 may be used to implement the feed stalk printed circuit boards 212-1, 212-2. The entire content of U.S. Provisional Patent Application Ser. No. 63/437,146 and PCT Application Serial No. PCT/CN2023/070056 are incorporated herein by reference. It will be appreciated that non-cloaked feed stalk printed circuit boards may alternatively be used.

The first dipole radiator 220-1 includes a first dipole arm 224-1 and a second dipole arm 224-2. The first and second dipole arms 224-1, 224-2 extend along a first axis. The second dipole radiator 220-2 includes a third dipole arm 224-3 and a fourth dipole arm 224-4. The third and fourth dipole arms 224-3, 224-4 extend along a second axis that is perpendicular to the first axis. In the depicted embodiment, the dipole radiators 220-1, 220-2 are implemented on respective dipole radiator printed circuit boards 230-1, 230-2. Each dipole arm 224 comprises a metal pattern that is printed on the front side of one of the dipole radiator printed circuit boards 230-1, 230-2. In other embodiments, the dipole arms 224 may comprise respective metal patterns that are printed on the rear side of the dipole radiator printed circuit boards 230-1, 230-2. Such an embodiment may advantageously increase the amount of dielectric loading of the dipole arms 224 as a non-air dielectric is then disposed on both sides of each dipole arm 224.

Each dipole radiator printed circuit board 230 includes first and second slot-like openings 232 therein. Each feed stalk printed circuit boards 212-1, 212-2 includes a pair of forwardly-extending tabs 214. Each tab 214 extends through a respective one of the slot-like openings 232, which acts to mount the dipole radiator printed circuit boards 230-1, 230-2 on the feed stalk 210. Each tab 214 includes a metal pattern thereon that may be galvanically or capacitively coupled to a respective one of the dipole arms 224. RF signals that are input at the base (rear) of the feed stalk printed circuit boards 212-1, 212-2 couple to the respective dipole arms 224 through the metal patterns on the respective tabs 214. Thus, the dipole radiators 220-1, 220-2 are each implemented as center fed dipole radiators 220.

FIG. 3B is an enlarged front view of the dipole radiator printed circuit boards 230 that more clearly illustrates the design of the dipole arms 224. Referring to FIGS. 3A and 3B, each dipole arm 224 is implemented as a cloaked dipole arm that is configured to be substantially transparent to RF energy in some or all of the mid-band operating frequency range. In particular, each dipole arm 224 comprises at least two widened metal segments 226-1, 226-2 that are connected by a narrow inductive metal trace 228. As explained, for example, in the above-referenced U.S. Pat. No. 10,770,803, each narrowed inductive metal trace 228 may act as a high impedance section that interrupts currents in the mid-band operating frequency range. In the low-band operating frequency range, the at least two widened metal segments 226-1, 226-2 and the narrow inductive metal trace 228 may appear as a single piece of metal that has an electrical length of about one quarter the center wavelength of the low-band operating frequency range. In contrast, at the mid-band operating frequency range, the at least two widened metal segments 226-1, 226-2 may appear as separate unconnected pieces of metal. Each widened metal segment 226 may have a length that is less than one quarter the center wavelength of the mid-band operating frequency range. Moreover, the widened and narrowed metal segments may form a resonant circuit that may be configured to resonate at one or more predetermined frequencies (such as a frequency in the mid-band frequency range). As a result, the dipole arms 224 may be cloaked with respect to RF energy in the mid-band operating frequency range since mid-band currents are suppressed from forming on the dipole arms 224.

While each dipole arm 224 is implemented to have a specific “cloaking” pattern, it will be understood that a wide variety of cloaking radiating elements are known in the art, and any appropriate cloaking dipole arm may be used. Moreover, while the dipole arms 224 are implemented as printed circuit board based dipole arms, it will be appreciated that in other embodiments other implementations may be used. For example, sheet metal dipole arms could alternatively be used.

Dipole radiators typically have an electrical length of about one-half of a wavelength that corresponds to a center frequency of the operating frequency band of the radiating element. If the dipole arm is relatively narrow and surrounded by air, the electrical length will typically correspond to the physical length. In many cases, dipole arms are formed as loops or are widened (e.g., have leaf shapes) which allows the physical length of the dipole arm (as measured from the base of the arm to the distal end thereof) to be reduced while maintaining an electrical length of about one-half of the center wavelength.

Low-band radiating elements are typically designed to operate in the 617-960 MHz frequency band or in the 696-960 MHz frequency range. Thus, a dipole radiator having a physical end-to-end length that is half a wavelength of the 788.5 MHz center frequency of the 696-960 MHz frequency band has a length of about 180 mm. A cross-dipole low-band radiating element having dipole radiators that each have a length of 180 mm will have a footprint that is a square having sides that are about 127 mm (i.e., the width of each such radiating element is 127 mm). Thus, a base station antenna having two linear arrays of such low-band radiating elements will be relatively wide, as the arrays consume 254 mm in the width direction of the antenna and additional room is required so that the two arrays can be spaced apart from each other and also spaced apart from the outer edges of the antenna (so that the reflector extends farther in the width direction than the radiating elements). As a result, base station antennas that include two linear arrays of low-band radiating elements typically have a width that exceeds 400 mm.

As noted above, one known technique for reducing the physical size of a dipole arm while maintaining a desired electrical length is to "dielectrically load" the dipole arm. A dipole arm may be dielectrically loaded by placing blocks of relatively high dielectric constant dielectric materials on one or more sides of the dipole arm. The higher the dielectric constant, the thicker the dielectric blocks and the more sides of the dipole arm on which the dielectric blocks are placed the more the physical size of the dipole arm may be reduced while maintaining a desired electrical length.

Referring again to FIG. 3A, the radiating element 200 further includes first through fourth dielectric blocks 240-1 through 240-4 that are used to dielectrically load the dipole arms 224. In the depicted embodiment, each dielectric block 240 is mounted immediately behind a respective one of the dipole arms 224. Each dielectric block 240 may comprise, for example, a solid block of dielectric material. The dielectric material used to form each dielectric block 240 may have a relatively high dielectric constant. For example, each dielectric block 240 may be formed using a dielectric material that has a dielectric constant that is greater than 4.0, greater than 5.0, greater than 6.0, greater than 7.0, greater than 8.0, or greater than 9.0 in example embodiments. In the depicted embodiment, a thickness of each dielectric block 240 (in the forward direction) is much greater than a thickness of its associated dipole arm 224 (i.e., the dipole arm 224 that is positioned directly behind each respective dielectric block 240). In some embodiments, the dielectric blocks 240 may each have a thickness (in the forward direction of the radiating element 200) of at least 10 mm. In other embodiments, the dielectric blocks 240 may each have a thickness of at least 15 mm, 20 mm or 25 mm. In some embodiments, a thickness of each dielectric block 240 may be at least three times, at least four times, at least eight times, at least ten times or at least fifteen times the thickness of the metal portion of its associated dipole arm 224. It will be appreciated, however, that the thicknesses of the dielectric blocks 240 relative to their associated dipole arms 224 may be a function of, among other things, the dielectric constant of the dielectric material used to form the dielectric blocks 240 and a desired amount of dielectric loading of the dipole arms 224. Accordingly, it will be appreciated that thicker or thinner dielectric blocks 240 may be used. In some embodiments, the dielectric blocks 240 may be relatively thin and hence may be sheet-like dielectric blocks 240. It will also be appreciated that in other embodiments the shapes of the dielectric blocks 240 may be varied from that which is shown in FIG. 3A, and/or that one or more of the dielectric blocks 240 may be replaced with multiple dielectric blocks 240 that may be directly adjacent each other or spaced apart from each other.

As shown in FIG. 3A, each dipole arm 224 may be mounted directly on its associated dielectric block 240 in some embodiments. In the depicted embodiments, a plurality of dielectric screws 242 are used to mount each printed circuit board based dipole arm 224 on a respective one of the dielectric blocks 240. The back side of the printed circuit board 240 of each printed circuit board based dipole arm 224 may directly contact its associated dielectric block 240.

Figure 3C:
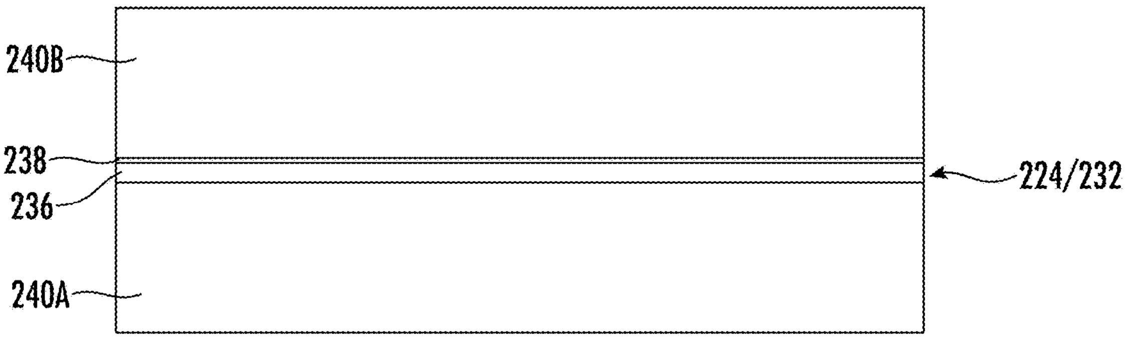
FIG. 3C is a schematic view illustrating a printed circuit based dipole arm that has dielectric blocks positioned both in front of and behind the dipole arm.

In the depicted embodiment, dielectric blocks 240 are only provided behind each dipole arm 224. It will be appreciated that in other embodiments each dipole arm 224 may be sandwiched between a pair of dielectric blocks 240A, 240B as is schematically shown in FIG. 3C. In the view of FIG. 3C, the dipole arm 224 is implemented as a metal layer 238 on a front surface of a dielectric substrate 236 of the dipole radiator printed circuit board 230. In still other embodiments, dielectric blocks 240 may additionally be provided that cover side surfaces of the dipole radiator printed circuit boards 230.

As noted above, the radiating element 200 may further include a dielectric support structure 250. In the depicted embodiment, the dielectric support structure 250 comprises a feed stalk support 252 and a dielectric block support 260. The feed stalk support 252 may include legs 254 that are used to mount the feed stalk support 252 on a reflector (or feed board) of a base station antenna that includes the radiating element 200 and a frame 256 that includes channels 258 that receive outer edges of the feed stalk printed circuit boards 212 to hold the feed stalk printed circuit boards 212 in their proper positions. The dielectric block support 260 is positioned forwardly of the feed stalk support 252 and is mounted on shoulders 216 that are formed in the feed stalk printed circuit boards 212. The dielectric block support 260 includes a central section 262 that has an opening. The feed stalk printed circuit boards 212 extend through the opening. The dielectric block support 260 further includes four arms 264 that extend radially outwardly from the central section 262. Each dielectric block 240 may be mounted on a respective one of the arms 264.

The dielectrically loaded dipole radiators 220-1, 220-2 may have a significantly reduced physical length. In example embodiments, each dielectrically loaded dipole radiator 220 may have a length of about 113 mm, which means that the dipole arms 224 in the radiating element 200 are reduced by more than 35% as compared to a conventional dipole radiator.

While implementing the low-band radiating elements 122 in the base station antenna 100 to have dielectrically loaded dipole arms 224 may significantly reduce the size of each low-band radiating element 122/200, the dielectric blocks 240 may negatively affect the performance of mid-band radiating elements 132 that are mounted rearwardly of the low-band radiating elements 122/200. This is particularly true when the low-band radiating elements 122/200 "overlap" the mid-band radiating elements 132 (i.e., an axis that is perpendicular to the main surface of the reflector 110 extends through both the low-band and the mid-band radiating elements 122/200, 132), as is the case in the base station antenna 100. The performance degradation arises because the dielectric blocks 240 act to focus the mid-band radiation incident thereon, which distorts the element patterns of the mid-band radiating elements 132. While the type and degree of this distortion will vary depending on the relative locations of the low-band and mid-band radiating elements 122/200, 132, it will in most cases degrade the shape of the mid-band antenna beams.

As discussed above, pursuant to embodiments of the present invention, metal patterns may be provided that are used to reduce the impact that the dielectric blocks 240 may have on the radiation patterns of mid-band radiating elements 132 that are mounted in close proximity to the low-band radiating element 122/200. The metal patterns may be metamaterial metal patterns in some embodiments.

Figure 4A:
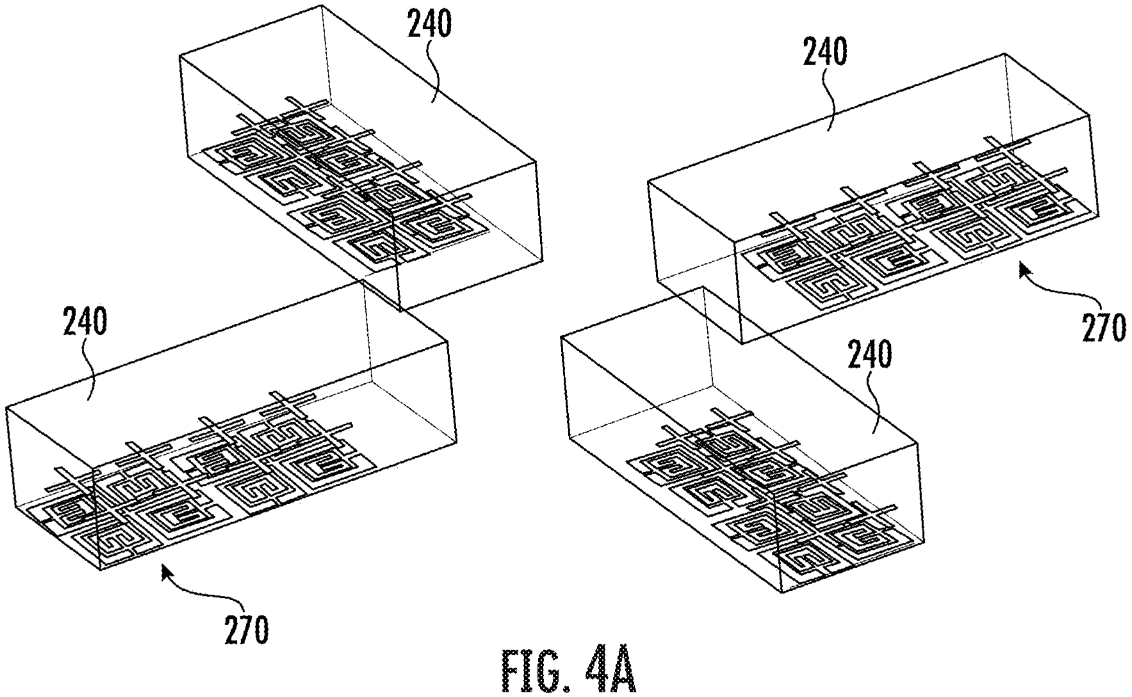
FIG. 4A is a schematic front view of the dielectric blocks with metamaterial metal patterns thereon that are included in the low-band radiating element of FIG. 3A.
Figure 4B:
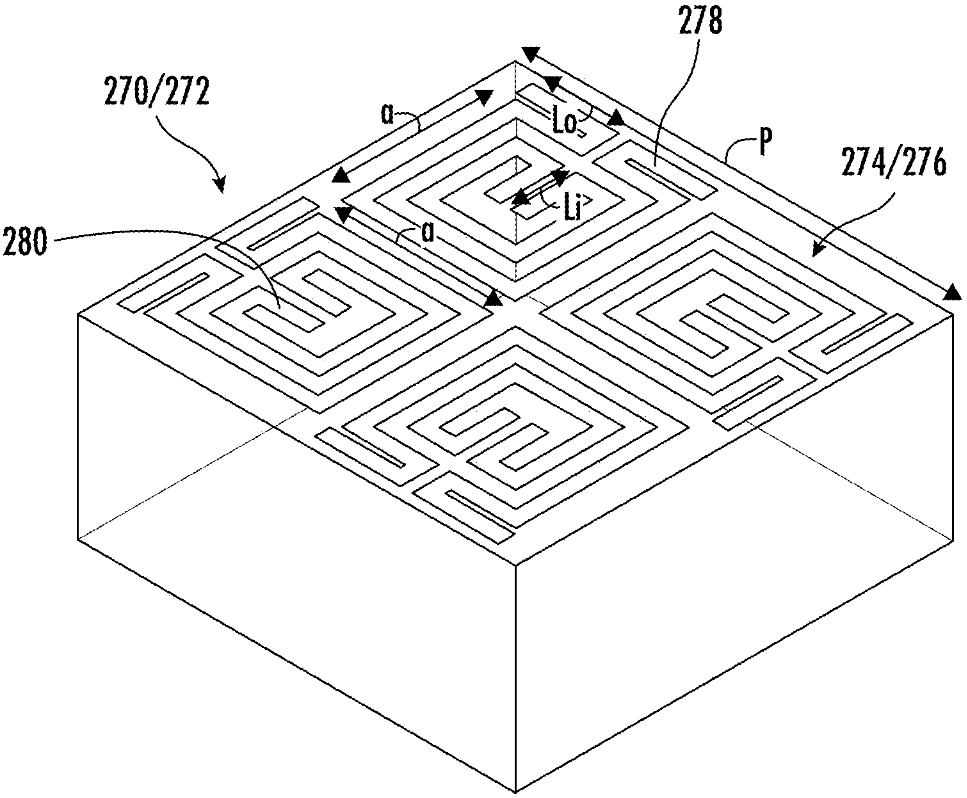
FIG. 4B is an enlarged schematic perspective view of a portion of one of the dielectric blocks that is shown in FIG. 4A.

FIGS. 4A and 4B depict example metamaterial metal patterns 270 that may be used to cloak the dielectric blocks 240 of radiating element 200. In particular, FIG. 4A is a schematic front view of the four dielectric blocks 240 included in radiating element 200 with respective metamaterial metal patterns 270 thereon. FIG. 4B is an enlarged schematic perspective view of a portion of one of the dielectric blocks 240 that is shown in FIG. 4A that illustrates a unit cell of the metamaterial metal pattern 270.

As shown in FIG. 4A, each metamaterial metal pattern 270 may be mounted rearwardly of its associated dielectric block 240 in some embodiments. In the depicted embodiment, each metamaterial metal pattern 270 is printed or otherwise formed directly on its associated dielectric block 240 so that each metamaterial metal pattern 270 and its associated dielectric block 240 are a unitary (monolithic) structure. In other embodiments, the metamaterial metal patterns 270 may be separate from their associated dielectric blocks 240 and may be mounted using external mounting structures. Each metamaterial metal pattern 270 may comprise a plurality of cells 272. Each cell 272 may have an identical pattern (but not necessarily orientation). Each cell 272 may comprise a plurality of sub-units 274. Each sub-cell 274 may comprise a unit cell of a metamaterial structure in some embodiments.

A metamaterial refers to a material that is engineered to have a property that is not found in naturally occurring materials. Metamaterials typically have a unit cell structure and are primarily designed to influence electromagnetic waves. Each unit cell of a metamaterial structure may have a size that is a small fraction (e.g., $1/10^{th}$ or less) of a wavelength of the electromagnetic waves that are to be influenced by the metamaterial structure. Example structures that may be used to implement the unit cells of a metamaterial structure are split ring resonators and complementary split ring resonators.

A split ring resonator consists of a pair of concentric metallic rings (also called loops), which are usually formed by etching a metal layer on a dielectric substrate (e.g., using printed circuit board fabrication techniques). Slits are provided in each ring. The rings may be square, circular, oval, rectangular or any other appropriate shape. A small gap is provided between the inner and outer rings. Magnetic flux that is incident on the split ring resonator induces rotating currents in the rings, and in response to the currents, the rings produce their own flux to enhance or oppose the incident electromagnetic field (depending on the resonant properties of the split ring resonator). The small gap between the rings produce large capacitance values which lower the resonating frequency, which allows split ring resonators to act as if they are electrically smaller (as compared to their physical size) when responding to RF energy.

As shown in FIG. 4B, in one example embodiment, each cell 272 comprises four sub-cells 274, where each sub-cell 274 comprises a split ring resonator 276. Each split ring resonator 276 has a different orientation. Split ring resonators 276 having different orientations may be used because the response of the split ring resonator 276 may vary based on the direction of the incident RF energy, since the incident RF energy will have a specific polarization. By providing sub-units 274 in which split ring resonators 276 having different orientations are used the response of the metamaterial metal patterns 270 may be made more consistent regardless of the locations of the mid-band radiating elements 132 with respect to low-band radiating element 122/200.

As shown in FIG. 4B, each unit 272 may define a square having sides of length "P." Each sub-unit 274 may comprise a split ring resonator 276 that defines a respective rectangle. The outer ring of each split ring resonator 276 may define a square having sides of length "a." On the side of this square where the "split" is provided the metal pattern folds back on itself outside the outer ring to define a pair of first arms 278 that extend in either direction from the gap defined by the split. Each first arm 278 has a length Lo. The inner ring of each split ring resonator 276 may also define a square. On the side of this square (the square defined by the inner ring) where the split is provided the metal pattern folds inwardly to extend into the interior of the square to define a pair of second arms 280. Each second arm 280 has a length Li. The variable "a" may be used for coarse tuning of the frequency response of the split ring resonator 276. The variables Li and Lo may be used for fine tuning of the frequency response.

The metamaterial metal patterns 270 are positioned behind the dielectric blocks 240 so that the metamaterial metal patterns 270 may reflect/absorb RF energy emitted by nearby mid-band radiating elements 132 that would otherwise impinge on the dielectric blocks 240. The metamaterial metal patterns 270 may also help improve the cloaking performance of the dipole arms 224, since the metamaterial metal patterns 270 may prevent some of the mid-band radiation from impinging on the dipole arms 224 of the low-band radiating element 122/200.

Figure 5A:
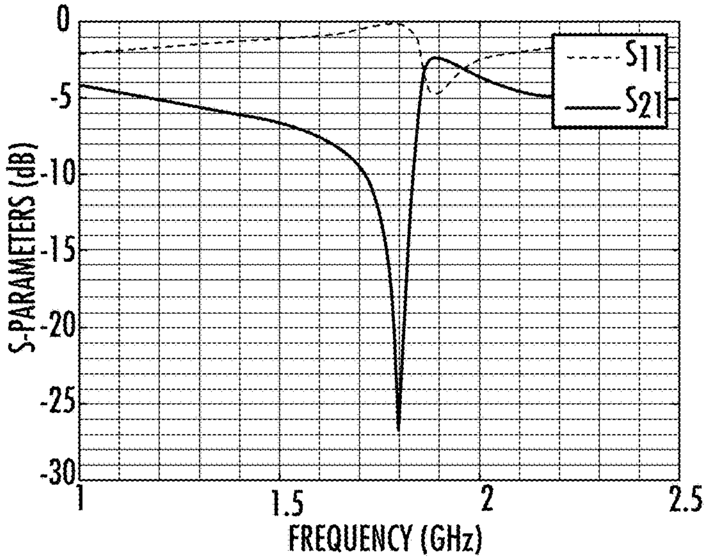
FIG. 5A is a graph illustrating the reflection (S11) and transmission (S21) performance of the metamaterial structures included in the radiating element of FIG. 3A.

FIG. 5A is a graph illustrating the reflection (S11) and transmission (S21) performance of the metamaterial metal patterns 270 that are included in the radiating element 200 of FIG. 3A. As shown in FIG. 5A, the transmission curve (S21) includes a steep null at about 1850 MHz. This illustrates that RF energy on the metamaterial metal pattern 270 in this frequency range will generally not pass through the metamaterial metal pattern 270 but instead will be reflected and/or absorbed by the metamaterial metal pattern 270. Moreover, throughout most of the 1428-2170 MHz frequency band the transmission is below −5 dB. Thus, FIG. 5A illustrates that the metamaterial metal patterns 270 may reduce the amount of RF energy emitted by nearby mid-band radiating elements 132 that is incident on the dielectric blocks 240, thereby reducing the influence that the dielectric blocks 240 may have on the antenna beams formed by the mid-band arrays 130.

Figure 5B:
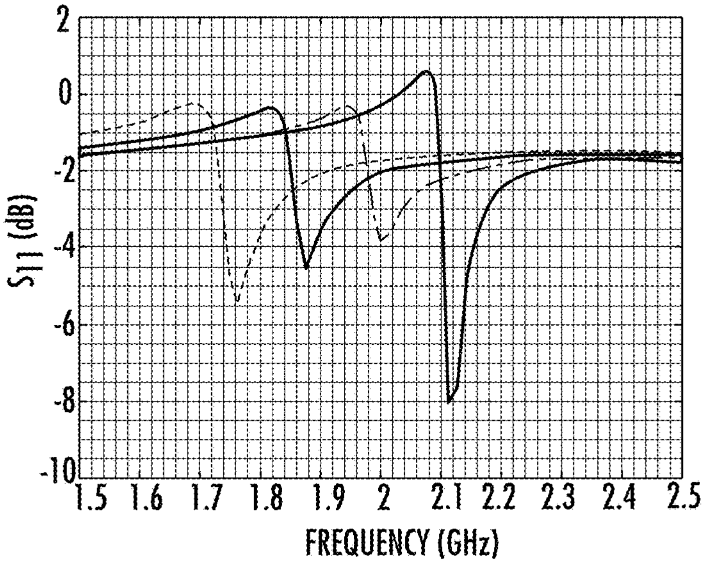
FIGS. 5B and 5C are graphs illustrating how the reflection (S11) and transmission (S21) performance, respectively, of the metamaterial structures included in the radiating element of FIG. 3A can be changed by adjusting the lengths of conductive lines within the unit cells of the metamaterial structures.
Figure 5C:
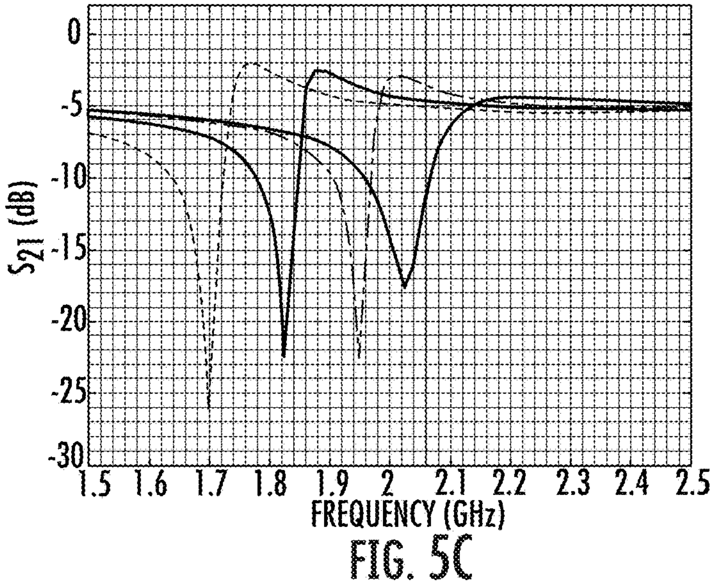

As described above, by adjusting the parameters a, Li and Lo the location of the null in the transmission curve (S21) shown in FIG. 5A may be adjusted. FIGS. 5B and 5C are graphs illustrating how the reflection (S11) performance (FIG. 5B) and the transmission (S21) performance (FIG. 5C) of the metamaterial structures 270 included in the radiating element 200 of FIG. 3A can be changed by adjusting the parameters a, Li and Lo within the cells 272 of the metamaterial structures 270. As shown in FIG. 5C, if metamaterial metal patterns that are tuned for different frequencies are provided, the metamaterial structures 270 may have increased rejection in the mid-band frequency band. Thus, if a metamaterial structure 270 is used that has a relatively narrow frequency response, the response may be widened by including a plurality of narrowband metamaterial structures 270 that are tuned to reject incident RF energy in different frequency ranges. A metamaterial structure 270 having the response shown in FIG. 5C could be implemented, for example, using a printed circuit board having four metal layers that is mounted behind each dielectric block 270 in the radiating element 200 of FIG. 3A. Alternatively, fewer layers of metal patterns could be used by including cells 272 that are designed to reject incident RF energy in different frequency ranges in the same metal layer.

Figure 6A:
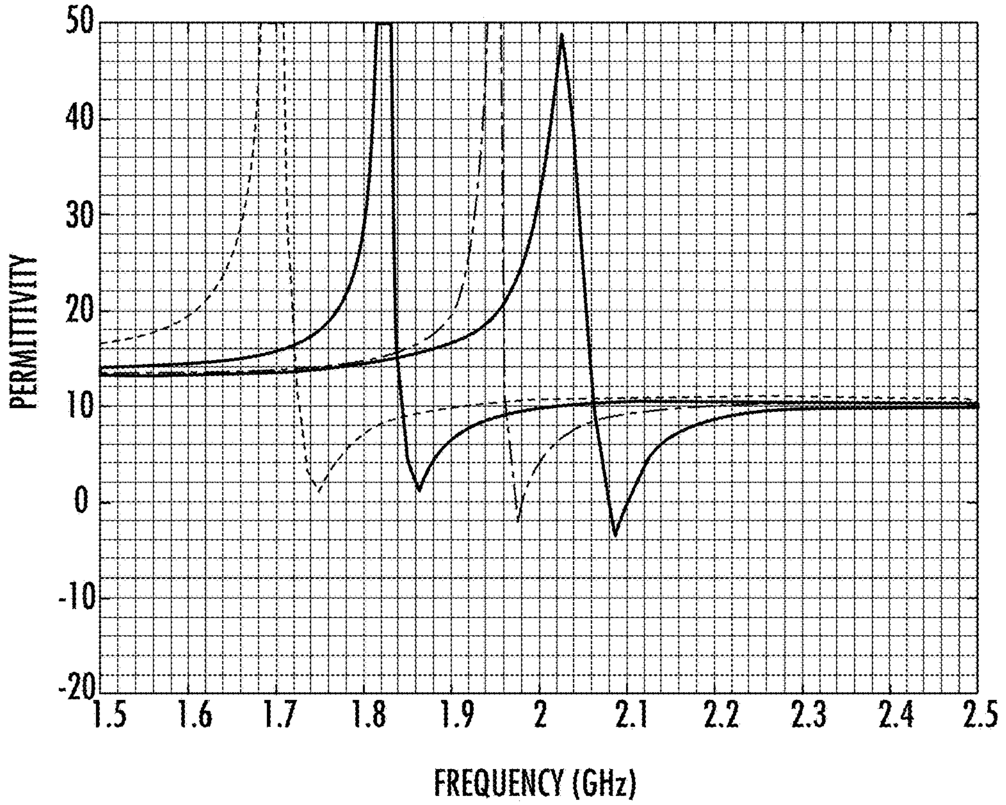
FIGS. 6A and 6B are graphs illustrating the permittivity and permeability, respectively, of the metamaterial structures used to generate the graphs of FIGS. 5A-5B.
Figure 6B:
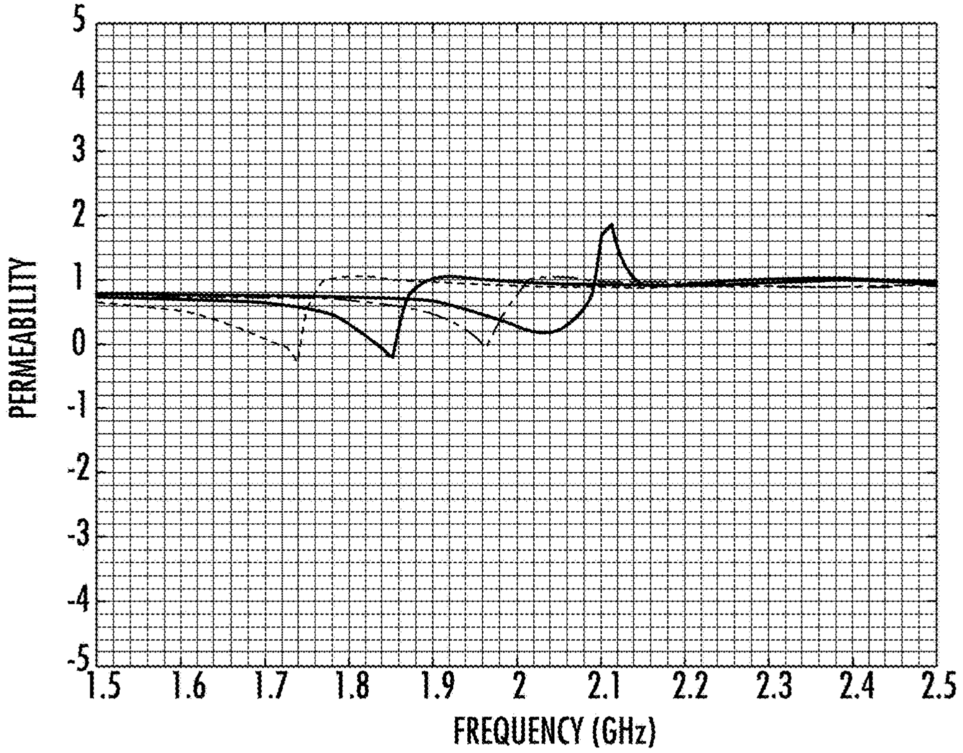

FIGS. 6A and 6B are graphs illustrating the permittivity and permeability, respectively, of the metamaterial metal patterns 270 used to generate the graphs of FIGS. 5A-5B. As shown in FIGS. 6A-6B, the permittivity and/or the permeability of the metamaterial metal patterns 270 may be negative in select frequency ranges in some embodiments.

One way to reduce the width of a base station antenna that includes two arrays of low-band radiating elements is to use so-called L-arrays, Y-arrays or other arrays that have increased array apertures in the azimuth plane. For example, U.S. Pat. No. 11,031,678 ("the '678 patent"), issued Jun. 8, 2021, illustrates at FIG. 2A a known base station antenna that includes two arrays of radiating elements that are each implemented as L-arrays. In this base station antenna, two columns of radiating elements are provided that are connected to feed networks to provide two arrays of dual-polarization radiating elements. The first array comprises the top radiating element in the left column plus all but the bottom radiating element in the right column. The second array comprises the bottom radiating element in the right column plus all but the top radiating element in the left column. With this arrangement, each array includes a plurality of radiating elements that are all in a first column plus one radiating element from a second column, and each array has an L-shape (which may be a rotated and/or inverted L-shape). By off-setting one of the radiating elements in each array in the horizontal direction, the aperture of each array is increased in the azimuth plane, which, with proper phasing of the radiating elements, acts to reduce the azimuth HPBW of the antenna beams generated by each array. One disadvantage, however, of this design is that it requires adding an additional radiating element to each column (to allow one row of each array to include two radiating elements), which increases the length and cost of the antenna.

FIG. 2B of the '678 patent illustrates another known base station antenna that provides an increased horizontal aperture without the need for adding an extra radiating element in each column. The base station antenna shown in FIG. 2B of the '678 patent includes two columns of low-band radiating elements that form first and second so-called "Y-shaped" arrays (note that each array is one radiating element short of having a true "Y-shape"). With this design, each array includes the bottom radiating element in a first of the two columns of radiating elements plus all but the bottom radiating element of the radiating elements in the other column. Since each array includes a radiating element that is in the opposite column, the horizontal aperture of each array is increased, with a commensurate reduction in the azimuth beamwidth. Moreover, since the base station antenna of FIG. 2B does not include two radiating elements in any row, it does not suffer from the cost and size disadvantages associated with base station antenna of FIG. 2A of the '678 patent. FIG. 2C of the '678 patent illustrates yet another base station antenna that has an increased aperture in the azimuth plane.

The base station antennas according to embodiments of the present invention may employ the techniques shown in FIGS. 2A-2C of the '678 patent, or similar arrangements of radiating elements that increase the horizontal apertures of the arrays, in order to further reduce the size of the base station antenna. When these techniques are used, the size of the low-band radiating elements may be reduced to a degree while still achieving a desired azimuth HPBW. When the size of the low-band radiating elements are reduced, the overall width of the base station antenna may likewise be reduced.

Figure 7:
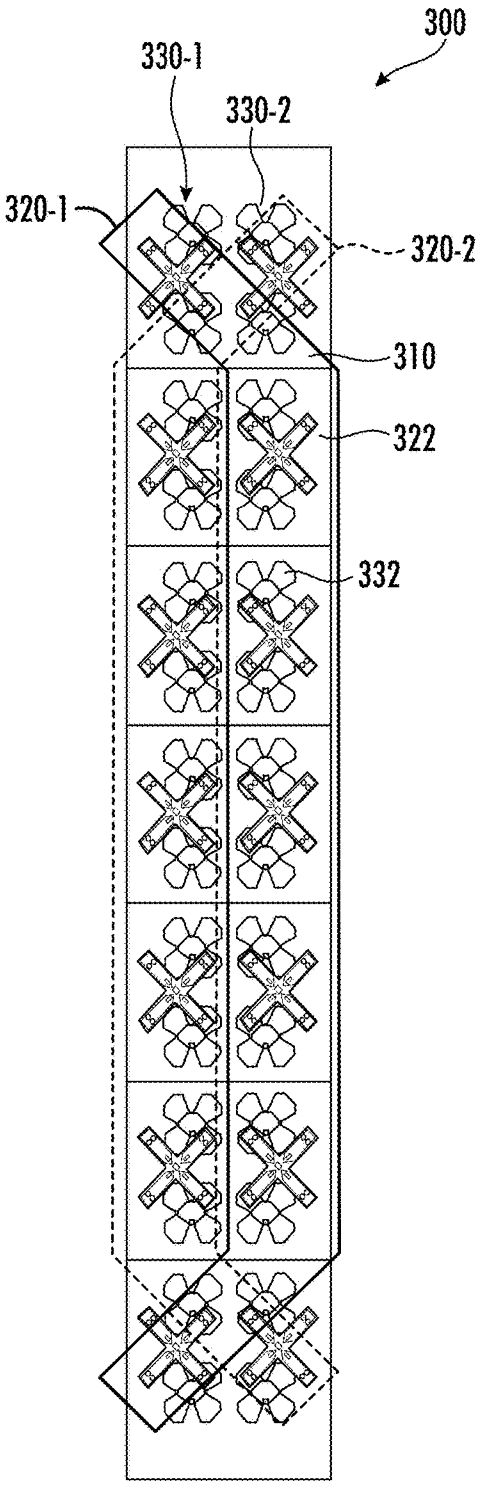
FIG. 7 is a schematic front view of a modified version of the base station antenna of FIG. 2A with the radome removed that shows the low-band arrays may include radiating elements from both columns in order to help further shrink the size of the low-band radiating elements.

FIG. 7 is a schematic front view of a base station antenna 300 (with the radome removed) according to further embodiments of the present invention that is a modified version of the base station antenna 100 of FIG. 2A. In the base station antenna 300 of FIG. 7, each low-band array 320 in base station antenna 300 is implemented as a "double-Y shaped" array. As shown in FIG. 7, the base station antenna 300 includes two vertically extending columns of low-band radiating elements 322. The first low-band array 320-1 includes the top and bottom radiating elements 322 in the right-side column of low-band radiating elements 322, plus the five middle radiating elements 322 in the left-side column. The second low-band array 320-2 includes the top and bottom radiating elements 322 in the left-side column of low-band radiating elements 322, plus the five middle radiating elements 322 in the right-side column. Since each low-band array 320 includes five radiating elements 322 from one of the columns plus two radiating elements 322 from the other column, the azimuth HPBWs of the antenna beams generated by each array will be narrowed as compared to an array of low-band radiating elements that is implemented as a single, vertically-extending column of radiating elements. Thus, the physical size of each low-band radiating element 322 used in base station antenna 300 may be reduced as compared to such a conventional antenna while still being capable of generating antenna beams having the same azimuth HPBW. This allows the width of base station antenna 300 to be reduced. The low-band radiating elements 322 used in base station antenna 300 may have the design of the low-band radiating elements 200 of FIG. 3.

One way to further reduce the width of a base station antenna that includes two arrays of low-band radiating elements is to space the two columns of radiating elements closer together. While such a technique reduces the width of the antenna, it also increases the coupling between the radiating elements of the two different low-band arrays. As discussed above, such increased coupling is undesirable as it degrades the shapes of the antenna beams formed by both arrays, and also may degrade other performance parameters such as return loss, insertion loss, etc.

Figure 8A:
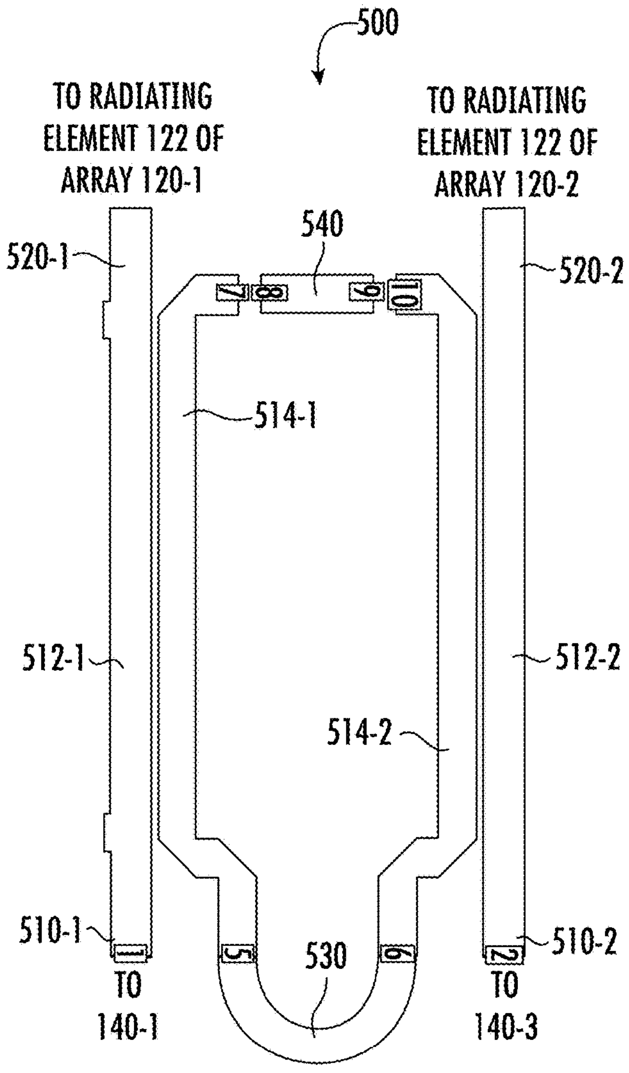
FIG. 8A is a schematic view of a hybrid coupler that can be included in the base station antennas according to embodiments of the present invention.
Figure 8B:
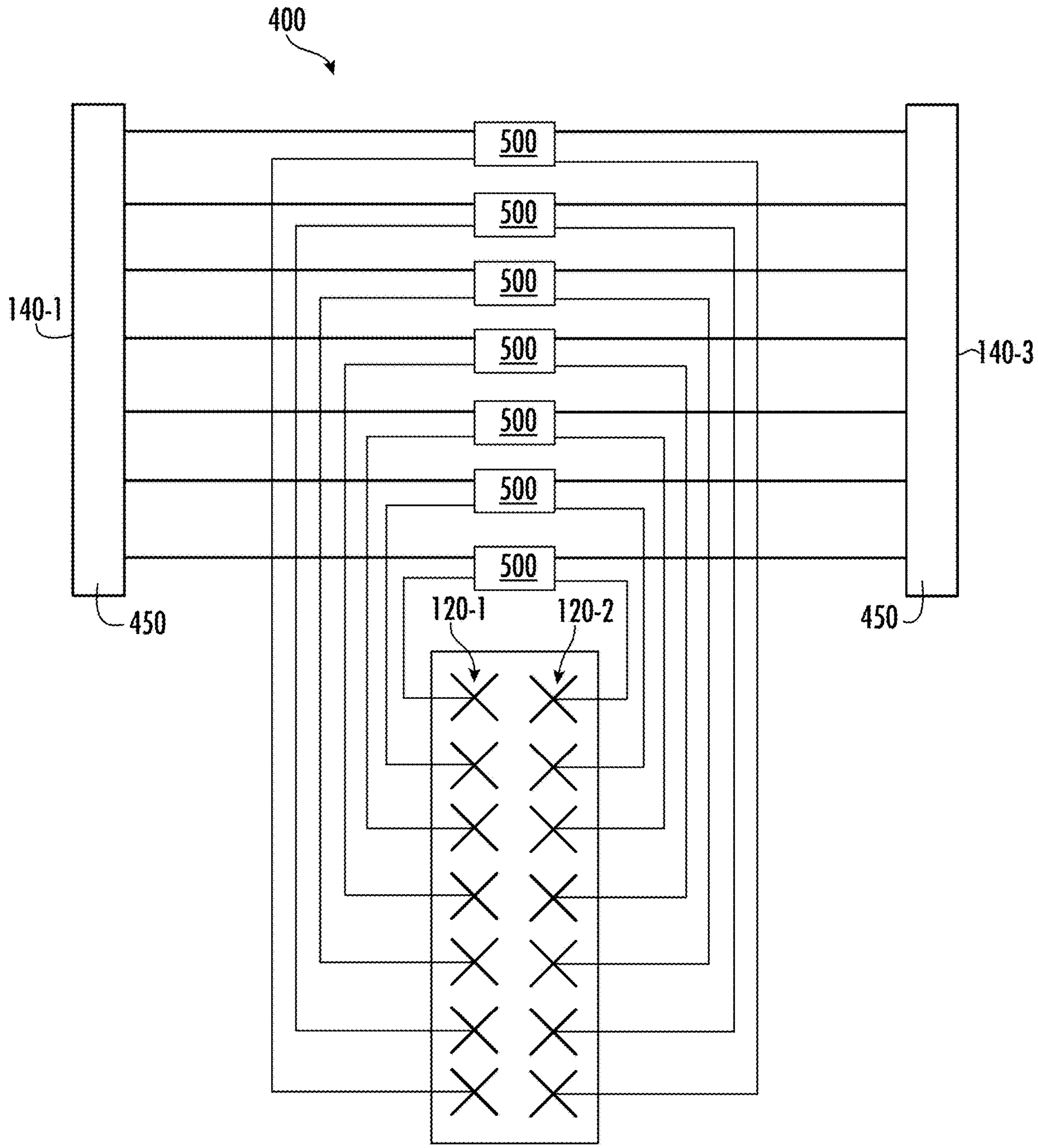
FIG. 8B is a block diagram illustrating how a plurality of the hybrid couplers of FIG. 8A may be used to improve port-to-port isolation in the base station antennas according to embodiments of the present invention.

Pursuant to further embodiments of the present invention, base station antennas are provided that employ one or more couplers that are used to at least partially cancel RF energy that couples from a first low-band array to a second low-band array that are provided in the antenna. FIGS. 8A and 8B illustrate such a base station antenna 400. The base station antenna 400 may be identical to base station antenna 100 of FIGS. 2A-2C, except that base station antenna 400 further includes a plurality of couplers 500 that are used to improve the port-to-port isolation between the low-band arrays 120-1, 120-2 in the base station antenna 400.

FIG. 8A is a schematic view of one of the couplers 500 that are included in the base station antenna 400. Coupler 500 may be configured to couple a small portion of the RF signal that is fed to one (or more) radiating elements 122 of the first low-band array 120-1 and then passes the coupled RF signal to one or more radiating elements 122 of the second low-band array 120-2. In some embodiments, the coupler 500 may be designed so that the amount of RF energy that it extracts from the RF signal that is fed to one (or more) radiating elements 122 of the first low-band array 120-1 may be approximately equal to the amount of RF energy that directly couples from the one (or more) radiating elements 122 of the first low-band array 120-1 to the one (or more) radiating elements 122 of the second low-band array 120-2 due to the close proximity of the two low-band arrays 120. This amount of coupled RF energy may be measured during the design of base station antenna 100, and the couplers 500 may then be designed to couple this amount of RF energy. A coupling path 530 (described below) of each coupler 500 may be configured so that the extracted RF energy, when it arrives at the one (or more) radiating elements 122 of the second low-band array 120-2, may have a phase that is approximately 180° out-of-phase with respect to the RF energy amount of RF energy that directly couples from the one (or more) radiating elements 122 of the first low-band array 120-1 to the one (or more) radiating elements 122 of the second low-band array 120-2. As such, each coupler 500 may be designed to couple RF energy that has about the same magnitude and opposite phase of RF energy that directly couples between the radiating elements 122 of the two low-band arrays 120, thereby partially or substantially cancelling the RF energy that directly couples from the radiating elements 122 of the first low-band array 120-1 to the radiating elements 122 of the second low-band array 120-2. It will be appreciated that the couplers 500 are multi-directional. Accordingly, in addition to cancelling RF energy that directly couples from the one or more radiating elements 122 of the first low-band array 120-1 to the one or more radiating elements 122 of the second low-band array 120-2, the couplers 500 will also cancel RF energy that directly couples from the one or more radiating elements 122 of the second low-band array 120-2 to the one or more radiating elements 122 of the first low-band array 120-1.

As shown in FIG. 8A, the hybrid coupler 500 includes a first input port 510-1 that may be coupled to a first RF port 140-1 of the base station antenna 500 through a first power divider 450 (see FIG. 8B). The first input port 510-1 is coupled to a first output port 520-1 via a first RF transmission line segment 512-1. The hybrid coupler 500 further includes a second input port 510-2 that may be coupled to a second RF port 140-3 of the base station antenna 400 through a second power divider (see FIG. 8B). The second input port 510-2 is coupled to a second output port 520-2 via a second RF transmission line segment 512-2. The first and second RF ports 140-1, 140-3 may each comprise first polarization RF ports (i.e., the coupler 500 is coupled to two RF ports 140 that transmit and receive the same polarization RF signals). The first output port 520-1 is coupled to one or more radiating elements 122 of the first low-band array 120-1 of the base station antenna 400, while the second output port 520-2 is coupled to one or more radiating elements 122 of the second low-band array 120-2 of the base station antenna 400.

The coupler 500 further includes a first coupling transmission line 514-1 that couples with the first RF transmission line segment 512-1 to tap off a small amount of the RF energy that is passed over the first RF transmission line segment 512-1 from the first RF port 140-1 to the one or more radiating elements 122 of the first low-band array 120-1. Similarly, the coupler 500 also includes a second coupling transmission line 514-2 that couples with the second RF transmission line segment 512-2 to tap off a small amount of the RF energy that is passed over the second RF transmission line segment 512-2 from the second RF port 140-3 to the one or more radiating elements 122 of the second low-band array 120-2. A first end of the first coupling transmission line 514-1 is coupled to a first end of the second coupling transmission line 514-2 via an RF transmission line 530, such as a coaxial cable, that forms a coupling path. As described above, an electrical length of the RF transmission line 530 may be set so that the phase of the RF energy coupled from the one or more radiating elements 122 of the first low-band array 120-1 to the one or more radiating elements 122 of the second low-band array 120-2 over the RF transmission line 530 may have a phase that is approximately 180° out-of-phase with respect to the RF energy that directly couples from the one or more radiating elements 122 of the first low-band array 120-1 to the one or more radiating elements 122 of the second low-band array 120-2. Second ends of the first coupling transmission line 514-1 and the second coupling transmission line 514-1 are coupled to a terminated load 540 such as, for example, a 50 ohm resistor. The first and second RF transmission lines 512-1, 512-2 may overlap with the respective first and second coupling transmission lines 514-1, 514-2 such that the amount of RF energy that couples therebetween is approximately equal to the amount of RF energy that directly couples from the one or more radiating elements 122 of the first low-band array 120-1 to the one or more radiating elements 122 of the second low-band array 120-2 (and vice versa).

FIG. 8B is a block diagram illustrating how a plurality of the hybrid couplers 500 of FIG. 8A may be used to improve port-to-port isolation in the base station antenna 400. As shown in FIG. 8B, a first RF port 140-1 of base station antenna 400 (which has a first polarization) is coupled to a first 1×7 power divider 450. The seven outputs of the first 1×7 power divider 450 are coupled to the first input ports 510-1 of seven respective couplers 500. Similarly, a second RF port 140-3 of base station antenna 400 (which also has the first polarization) is coupled to a second 1×7 power divider 450. The seven outputs of the second 1×7 power divider 450 are coupled to the second input ports 510-2 of seven respective couplers 500. The first output ports 520-1 of the seven couplers 500 are coupled to the respective seven low-band radiating elements 122 of the first low-band linear array 120-1. The second output ports 520-2 of the seven couplers 500 are coupled to the respective seven low-band radiating elements 122 of the second low-band linear array 120-2. Thus, each hybrid coupler 500 is configured to at least partially cancel the coupling between a radiating element 122 in the first low-band array 120-1 and a horizontally aligned radiating element 122 in the second low-band linear array 120-2.

In some cases, the couplers may be designed to cancel substantially all of the RF energy that directly couples between a pair of horizontally aligned radiating elements

122 from the first and second low-band linear arrays 120-1, 120-2. In other cases, this may result in too much power loss. In such situations, the couplers 500 may be designed to only cancel a portion of the coupled RF energy. This results in a compromise between the gain of the antenna beams and the shape thereof.

It will be appreciated that many modifications may be made to the above example embodiments without departing from the scope of the present invention. For example, the number of radiating elements in each column of the base station antennas may be varied from what is shown in the example embodiments above. Typical numbers of radiating elements per column may range from about four to twenty radiating elements, with six to ten radiating elements per column being common. As another example, while the above-described embodiments employ dipole radiating elements, it will be appreciated that other types of radiating elements may be used such as, for example, single polarization and dual polarization patch radiating elements.

While the example embodiments of the present invention discussed above are formed using low-band radiating elements, it will be appreciated that the techniques disclosed herein are equally applicable to radiating elements that operate in other frequency bands, such as the mid-band and high-band operating frequency ranges. Thus, each of the designs discussed above could alternatively be implemented using all mid-band or all high-band radiating elements.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Herein, the term “substantially” refers to variation of less than 10%.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term “and/or” includes any and all combinations of one or more of the associated listed items.

It will be understood that when an element is referred to as being “on” another element, it can be directly on the other element or intervening elements may also be present. In contrast, when an element is referred to as being “directly on” another element, there are no intervening elements present. It will also be understood that when an element is referred to as being “connected” or “coupled” to another element, it can be directly connected or coupled to the other element or intervening elements may be present. In contrast, when an element is referred to as being “directly connected” or “directly coupled” to another element, there are no intervening elements present. Other words used to describe the relationship between elements should be interpreted in a like fashion (i.e., “between” versus “directly between”, “adjacent” versus “directly adjacent”, etc.).

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” “comprising,” “includes” and/or “including” when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A base station antenna, comprising:
a reflector;
a first radiating element that extends forwardly from the reflector and that is configured to operate in a first frequency band, the first radiating element comprising:
a first dipole radiator that has first and second dipole arms;
a second dipole radiator that has third and fourth dipole arms;
a first dielectric block positioned adjacent the first dipole arm; and
a first metal pattern positioned between the first dielectric block and the reflector; and
a second radiating element that extends forwardly from the reflector and that is configured to operate in a second frequency band that is different from the first frequency band.

2. The base station antenna of claim 1, wherein the first metal pattern is configured to attenuate radio frequency (“RF”) energy emitted by the second radiating element that is incident on the first metal pattern.

3. The base station antenna of claim 1, wherein the first metal pattern comprises a metamaterial.

4. The base station antenna of claim 1, wherein the first metal pattern is printed on the first dielectric block.

5. The base station antenna of claim 1, wherein the first metal pattern has a negative refractive index.

6. The base station antenna of claim 1, wherein the first metal pattern has at least one of a negative permittivity and a negative permeability within at least a portion of the second frequency band.

7. The base station antenna of claim 1, wherein the first metal pattern comprises a plurality of unit cells.

8. The base station antenna of claim 7, wherein each unit cell includes a plurality of sub cells, and wherein at least some of the sub-cells in a first of the unit cells are oriented differently from other of the sub-cells in the first of the unit cells.

9. The base station antenna of claim 7, wherein a thickness of the first dielectric block in a forward direction is at least ten times a thickness of the first dipole arm.

10. The base station antenna of claim 1, wherein the first dielectric block is configured to dielectrically load the first dipole arm.

11. A base station antenna, comprising:
a second radiating element that is configured to operate in a second frequency band;
a first radiating element that is configured to operate in a first frequency band that is different from the second frequency band, the first radiating element comprising a first radiator and a first dielectric loading element for the first radiator, the first dielectric loading element including a first metal pattern that is not part of the first radiator and that is configured to reduce the impact of the first dielectric loading element on radio frequency ("RF") energy emitted by the second radiating element.

12. The base station antenna of claim 11, wherein the first radiator is a first dipole radiator has first and second dipole arms, the first radiating element further comprising a second dipole radiator that has third and fourth dipole arms, and the first dielectric loading element is positioned adjacent the first dipole arm.

13. The base station antenna of claim 12, wherein the first dipole arm is implemented using a first printed circuit board, and the first dielectric loading element is mounted rearwardly of the first printed circuit board.

14. The base station antenna of claim 12, wherein the first dipole arm is implemented as a sheet metal dipole arm.

15. The base station antenna of claim 12, wherein the first radiating element further comprises:

a second dielectric loading element positioned adjacent the second dipole arm;

a second metal pattern positioned between a second dielectric block and a reflector;

a third dielectric loading element positioned adjacent the third dipole arm;

a third metal pattern positioned between a third dielectric block and the reflector;

a fourth dielectric loading element positioned adjacent the fourth dipole arm; and a fourth metal pattern positioned between a fourth dielectric block and the reflector.

16. The base station antenna of claim 15, wherein each of the first through fourth dielectric loading elements has a dielectric constant that is greater than 4.0.

17. The base station antenna of claim 12, wherein the first metal pattern has at least one of a negative permittivity and a negative permeability within at least a portion of the second frequency band.

18. The base station antenna of claim 12, wherein each of the first through fourth dipole arms has an end-to-end physical length that is less than 0.2 of a wavelength that corresponds to a center frequency of the first frequency band.

19. The base station antenna of claim 11, wherein the first metal pattern comprises a metamaterial.

20. A radiating element that is configured to operate in a first frequency band, comprising:

a first dipole radiator that has a first dipole arm and a second dipole arm;

a second dipole radiator that has a third dipole arm and a fourth dipole arm wherein one or more dielectric blocks having dielectric constants of at least 4.0 are positioned adjacent the first through fourth dipole arms to dielectrically load the first through fourth dipole arms, and the dielectric blocks are cloaked with respect to radio frequency ("RF") energy in a second frequency band that is different from the first frequency band.

* * * * *